(12) United States Patent
Kawase et al.

(10) Patent No.: US 8,217,857 B2
(45) Date of Patent: Jul. 10, 2012

(54) DISPLAY, DISPLAY METHOD, AND ELECTRONIC DEVICE

(75) Inventors: Takeo Kawase, Suwa (JP); Takayuki Kondo, Chino (JP); Hitoshi Fukushima, Suwa (JP); Yuji Shinohara, Kofu (JP)

(73) Assignee: Seiko Epson Corporation, Tokyo (JP)

( * ) Notice: Subject to any disclaimer, the term of this patent is extended or adjusted under 35 U.S.C. 154(b) by 1161 days.

(21) Appl. No.: 12/043,698

(22) Filed: Mar. 6, 2008

(65) Prior Publication Data

US 2008/0252566 A1    Oct. 16, 2008

(30) Foreign Application Priority Data

Mar. 9, 2007    (JP) ................. 2007-060051

(51) Int. Cl.
*G09G 3/19* (2006.01)
*G09G 3/30* (2006.01)
*G09G 3/10* (2006.01)

(52) U.S. Cl. .......... 345/49; 345/76; 345/105; 315/169.3

(58) Field of Classification Search .......... 345/36, 345/46, 49, 76–81, 105; 315/169.3
See application file for complete search history.

(56) References Cited

U.S. PATENT DOCUMENTS

| 2005/0105161 A1 | 5/2005 | Nakai et al. |
| 2006/0279525 A1 | 12/2006 | Matsuda |
| 2007/0247418 A1 | 10/2007 | Nakai et al. |

FOREIGN PATENT DOCUMENTS

| JP | A 2002-003336 | 1/2002 |
| JP | A 2002-333643 | 11/2002 |
| JP | A 2005-037860 | 2/2005 |
| JP | A-2005-43590 | 2/2005 |
| JP | A-2005-215092 | 8/2005 |
| JP | A 2006-227249 | 8/2006 |

*Primary Examiner* — Srilakshmi K Kumar
(74) *Attorney, Agent, or Firm* — Oliff & Berrridge, PLC

(57) ABSTRACT

A display, comprising: a planar display section; a pixel space provided next to a side adjacent to one surface of the display section and encapsulating a plurality of kinds of colorants, each kind having a different color; an accumulation section provided in the pixel space and accumulating the colorants; a separation system that separates a specific kind of colorant from the accumulated colorants in the accumulation section; a transfer system that selects at least one kind of colorant from the separated colorants and transfers this colorant to the side adjacent to the display section of the pixel space. The separation system performs separation utilizing the magnitude of a dielectrophoretic force generated in each colorant upon receipt of an alternating electric field of a specific frequency applied by this system, the magnitude varying depending on the kind of the colorant. A color of at least the one kind of colorant transferred by the transfer system is displayed at the display section.

16 Claims, 17 Drawing Sheets

DISPLAY, DISPLAY METHOD, AND ELECTRONIC DEVICE

The entire disclosure of Japanese Patent Application No. 2007-060051, filed Mar. 9, 2007 is expressly incorporated by reference herein.

BACKGROUND

1. Technical Field

The present invention relates to a display, a display method, and an electronic device.

2. Related Art

Generally, when a dispersion system containing microparticles dispersed in liquid is subjected to an electric field, it is known that the microparticles move (electrophoretically migrate) in the liquid by Coulomb's force. This phenomenon is called electrophoresis. As new displays, electrophoretic displays displaying desired information (images) by use of electrophoresis are popular in recent years.

This display consumes low electricity because it has display memorability, in that the content of display is maintained even when voltage application is stopped. Also, because the display displays using a reflected light in particular, as used for regular printed materials, it has such features as wide viewing angle and high contrast.

Recently, technologies to realize color display using such a display are being developed.

For example, an electrophoretic color display is disclosed. In this display, display elements of Y (yellow), M (magenta), and C (cyan), or R (red), G (green), and B (blue) are each arranged per each pixel in parallel with a display plane.

Although color display is possible with this display, there is a problem that white display reflectance is low and black display reflectance is high. Thus, the contrast and color developability are not sufficient.

Also, because each display element of Y, M, C, or R, G, B is provided per each pixel, the size of each pixel is not easily reduced, and the definition of the display cannot be sufficiently increased.

In contrast, another display is known (e.g., see JP-A-2002-333643), in which the color display is performed by stacking the plurality of display elements so that each of Y, M, C, or R, G, B overlaps with each other.

This display may have higher definition. However, because the display is composed in such a manner that light transmitted through each display element of Y, M, C, or R, G, B is visually recognized, there is a problem that parallax is generated, and, with attenuation of light, brightness and contrast of the display decrease.

Also, because the allowable range of positional deviation is extremely narrow when stacking the display elements, alignment of the elements during stacking is difficult, and the cost for production processes increases.

SUMMARY

An advantage of the invention is to provide a reflective type display allowing multicolor display with high contrast and definition, an electronic device containing such a display, and a display method for displaying multiple colors with excellent display performance.

According to a first aspect of the invention, a display includes: a planar display section; a pixel space provided next to a side adjacent to one surface of the display section and encapsulating a plurality of kinds of colorants, each kind having a different color; an accumulation section provided in the pixel space and accumulating the colorants; a separation system that separates a specific kind of colorant from the accumulated colorants in the accumulation section; a transfer system that selects at least one kind of colorant from the separated colorants and transfers this colorant to the side adjacent to the display section of the pixel space, in that: the separation system performs separation utilizing the magnitude of a dielectrophoretic force generated in each colorant upon receipt of an alternating electric field of a specific frequency applied by this system, the magnitude varying depending on the kind of the colorant; and a color of at least the one kind of colorant transferred by the transfer system is displayed at the display section.

In this case, it is possible to provide a reflective type display that allows multicolor display and has high contrast and definition.

It is preferable that, in the display, the separation system select and separate the specific kind of colorant from the accumulated colorants by applying, as a driving force, an alternating electric field of a specific frequency at which the specific kind of colorant out of the colorants generates a dielectrophoretic force greater than those generated by other kinds of colorants.

In this case, because the specific kind of colorant is readily separated out of the plurality of kinds of colorants, a larger number of colors may be displayed by the display.

It is preferable that, in the display, the separation system include: at least one pair of electrodes for dielectrophoresis arranged in the accumulation section substantially parallel to the display section and applying the alternating electric field of the specific frequency to each of the colorants, a circuit applying a voltage between the pair of electrodes for dielectrophoresis, and a frequency varying circuit controlling the frequency of the voltage applied to the voltage applying circuit so as to change the frequency of the alternating electric field.

In this case, because each electrode is sufficiently set apart from the display section, it is difficult to see through the colorants during the separation from the display section. Therefore, it is possible to suppress unintended mixture of colors and to suppress decrease in contrast in the display at the display section.

It is preferable that, in the display, the pair of electrodes for dielectrophoresis include, between these electrodes, a plurality of sections of strong electric field at which the alternating electric field to be generated is strong and a plurality of sections of weak electric field at which the alternating electric field to be generated is weak.

In this case, one electrode has a plurality of portions at which the strength of the electric field is not uniform. Thus, it is possible to capture a larger number of colorants and to perform the display with better contrast and color developability.

It is preferable that, in the display, the separation system select and separate the specific kind of colorant from the accumulated colorants, by absorbing the specific kind of colorant near the sections of strong electric field between the pair of electrodes for dielectrophoresis by the action of the dielectrophoretic force.

In this case, it is possible to readily separate the specific kind of colorant from the accumulated colorants.

It is preferable that, in the display, the sections of strong electric field and the sections of weak electric field be distributed throughout the pair of electrodes for dielectrophoresis.

In this case, it is possible to generate a more uniform dielectrophoretic force in each of the colored particles diffused in the pixel space and to capture the colorants at the pair of electrodes for dielectrophoresis in a shorter period of time. Also, because the colorants cover the entire display section when the captured colorants have transferred to the side adjacent to the display section, it is possible to obtain the display with excellent contrast and color developability.

It is preferable that, in the display, the pair of electrodes for dielectrophoresis include a section in which a distance between the electrodes is large and a section in which a distance between the electrodes is small.

In this case, despite the simple structure, the portions of strong electric field and the portions of weak electric field may be readily provided between the pair of electrodes.

It is preferable that, in the display, the separation system include a plurality of pairs of electrodes for dielectrophoresis and separate different kinds of colorants from the accumulated colorants by generating, at each pair, an alternating electric field of a different frequency.

In this case, because it is possible to separate the plurality of kinds of colored particles having different colors in a single separation process, the display may be readily controlled.

It is preferable that, in the display, the separation system: further include a pair of electrodes for electrophoresis that applies a direct or pulse electric field and a circuit that applies a voltage between the pair of electrodes for electrophoresis; and separate the specific kind of colorant while electrophoretically migrating the colorants by the action of the electric field.

In this case, as if scanning all the colorants, the dielectrophoretic force may act uniformly on all of the colorants. As a result, it is possible to increase the ratio of the specific kind of colorant to be separated from the colorants.

It is preferable that at least the one pair of electrodes for dielectrophoresis be constituted of, at least in part, interdigital electrodes aligned substantially parallel to each other, and that each of the electrodes be arranged in a direction substantially perpendicular to a direction in which the colorants electrophoretically migrate by the action of the direct or pulse electric field.

In this case, more uniform dielectrophoretic force may act on all of the accumulated colorants. Also, because it is possible to absorb each of the colorants so as to be distributed in the entire pixel space, a greater number of colorants may be absorbed. Accordingly, the display contrast and color developability by the display may improve.

It is preferable that, in the display, the transfer system transfer the separated specific kind of colorant using the electrophoretic force that is generated in the specific kind of colorant upon receipt of a direct or pulse electric field applied by the system.

In this case, the specific kind of colorant may be selectively and readily transferred.

It is preferable that, in the display, the transfer system include: a pair of electrodes for transfer interposing the pixel space therebetween and disposed on a side adjacent to the display section and on a side opposite from the display section; and a circuit applying a voltage between the pair of electrodes for transfer.

In this case, even in such a simple structure, it is possible to include the transfer system that readily allows selective transfer of the specific kind of colorant.

It is preferable that the display further include: a plurality of pixel spaces, and the separation system and the transfer system corresponding to each pixel space.

In this case, a multicolor display becomes possible, and the amount of information to be displayed may increase. For example, various types of information such as color photographs can be displayed.

According to a second aspect of the invention, a display includes: a first substrate; a second substrate; an electrophoretic dispersion liquid positioned between the first and second substrates; a first through fourth electrodes positioned between the second substrate and the electrophoretic dispersion liquid; a first circuit applying a first electric field between the first and second electrodes; and a second circuit applying a second electric field between the third and fourth electrodes, in that: the electrophoretic dispersion liquid includes a first colorant and a second colorant of a different dielectrophoretic force; the first and second electrodes are located between the third and fourth electrodes; the first electric field imparting a dielectrophoretic force to the first and second colorants and transferring these colorants between the first and second electrodes; and the second electric field imparting an electrophoretic force to the first and second colorants and moving the same between the third and fourth electrodes.

In this case, it is possible to attain a reflective type display allowing multicolor display with high contrast and definition.

According to a third aspect of the invention, a display includes: a first substrate; a second substrate; an electrophoretic dispersion liquid positioned between the first and second substrates; a first through fourth electrodes positioned between the second substrate and the electrophoretic dispersion liquid; a first circuit applying a first electric field between the first and second electrodes; and a second circuit applying a second electric field between the third and fourth electrodes, in that: the electrophoretic dispersion liquid includes a first colorant and a second colorant of a different dielectrophoretic force; the first electric field imparting a dielectrophoretic force to the first colorant and allocating this colorant between the first and second electrodes; and the second electric field imparting a dielectrophoretic force to the second colorant and allocating this colorant between the third and fourth electrodes.

In this case, it is possible to attain a reflective type display allowing multicolor display with high contrast and definition.

According to a fourth aspect of the invention, a display method includes: (a) separating, within a pixel space provided next to a side adjacent to one surface of a planar display section, a specific kind of colorant from a plurality of kinds of colorants having different colors by applying an alternating electric field to the plurality of kinds of colorants by use of a dielectrophoretic force generated in each of the colorants as a driving force; and (b) selecting at least one kind of colorant out of the separated colorants and transferring this colorant to the side adjacent to the display section of the pixel space; and (c) displaying a color of at least the one kind of colorant transferred in step (b). The separation is performed in step (a) by applying an electric field of a specific frequency to the specific kind of colorant that corresponds to a color to be displayed at the display section, the frequency being such that the dielectrophoretic force generated in the specific kind of colorant is greater than dielectrophoretic forces generated in other kinds of colorants.

In this case, it is possible to perform high-performance multicolor display.

It is preferable that the display method further include repeatedly conducting the steps (a) and (b) so as to increase a ratio of the specific kind of colorant separated out of the plurality of colorants.

In this case, it is possible to perform higher performance display.

According to a fifth aspect of the invention, an electronic device contains the display device.

In this case, it is possible to attain an electronic device having the reflective type display capable of multicolor display with high contrast and definition.

With the display of the aspects of the invention, it is preferable that each colorant be particulate.

Because anisotropy of the dielectrophoretic force exerted on each colorant is suppressed, variation in the migration speed due to direction of electrophoresis may be reduced.

The display of the aspects of the invention includes: a first substrate that is a display section; a second substrate provided opposite from the first substrate; a pixel space provided between the first and second substrates and encapsulating a plurality of kinds of electrophoretic particles having different colors and a liquid phase dispersion medium with the electrophoretic particles dispersed therein; an accumulation section provided on a side adjacent to the second substrate in the pixel space and accumulating the electrophoretic particles; at least one pair of electrodes for dielectrophoresis that separates a specific kind of electrophoretic particles from the electrophoretic particles accumulated at the accumulation section by absorbing the specific kind of electrophoretic particles, by utilizing the magnitude of a dielectrophoretic force generated in each of the electrophoretic particles upon receipt of an alternating electric field of a specific frequency, the magnitude varying depending on the kind of the electrophoretic particles; a first circuit applying a voltage between the pair of electrodes for dielectrophoresis; a frequency varying circuit controlling the frequency of the voltage applied to the first circuit so as to change the frequency of the alternating electric field; a pair of electrodes for transfer that transfers the electrophoretic particles to the side adjacent to the display section of the pixel space by generating an electrophoretic force in at least one kind of the electrophoretic particles out of the separated electrophoretic particles by applying a direct or pulse electric field; and a second circuit applying a voltage between the pair of electrodes for transfer, in that a color of the one kind of colorant transferred or a mixed color of colors of the plurality of kinds of colorants is displayed at the display section.

It is therefore possible to attain a reflective type display allowing multicolor display with high contrast and definition.

It is preferable that the display of the aspects of the invention further include: a pair of electrodes for electrophoresis provided in the accumulation section substantially parallel to the first substrate and arranged opposite from each other, with the pair of electrodes for dielectrophoresis interposed therebetween; and a third circuit applying a voltage between the pair of electrodes for electrophoresis; in that, while migrating the electrophoretic particles substantially parallel to the first substrate, the separation is conducted by generating a dielectrophoretic force in the specific kind of electrophoretic particles that is larger than those generated in the other kinds of electrophoretic particles so as to capture the specific kind of electrophoretic particles.

Accordingly, as if scanning all the electrophoretic particles, the dielectrophoretic force may act uniformly on all of the particles. As a result, it is possible to increase the ratio of the specific kind of particles to be separated from all the particles.

With the display of the aspects of the invention, it is preferable that the pair of electrodes for transfer include a first electrode for transfer provided on a side adjacent to one surface of the first substrate and a second electrode for transfer provided on a side adjacent to one surface of the second substrate.

Accordingly, with the simple structure, specific electrophoretic particles may be readily transferred.

With the display of the aspects of the invention, it is preferable that the pair of electrodes for dielectrophoresis be used as at least a part of the second electrode for transfer.

Accordingly, because it is not required to prepare the second electrode for transfer separately from the pair of electrodes for dielectrophoresis, it is possible to simplify the structure of the display and to reduce the number of manufacturing processes.

With the display of the aspects of the invention, it is preferable that, regarding the electrophoretic dispersion liquid, the specific frequency of the electrophoretic particles be suitably adjusted by setting at least one condition out of conditions such as size, constituting material, and configuration of the electrophoretic particles, and constituting material of the liquid phase dispersion medium.

Accordingly, it is possible to readily adjust the specific frequency of the respective particles among the plurality of kinds of electrophoretic particles and to provide sufficient difference between the specific frequencies. As a result, it is possible to improve separation performance when separating the specific electrophoretic particles out of all the electrophoretic particles With the display of the aspects of the invention, it is preferable that the polarity of zeta potentials of all the electrophoretic particles be identical.

Accordingly, when all the electrophoretic particles are subjected to the direct or pulse electric field, for example, each of the particles electrophoretically migrates in the same direction. As a result, it is possible to readily control each of the electrophoretic particles.

With the display of the aspects of the invention, it is preferable that the electrophoretic dispersion liquid further include another electrophoretic particles having a color different from the electrophoretic particles mentioned above, and that the polarity of zeta potential of the another electrophoretic particles be either opposite from those of the electrophoretic particles mentioned above or substantially zero.

Accordingly, the color of the another electrophoretic particles may be used as a background color of the colors of the described electrophoretic particles.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
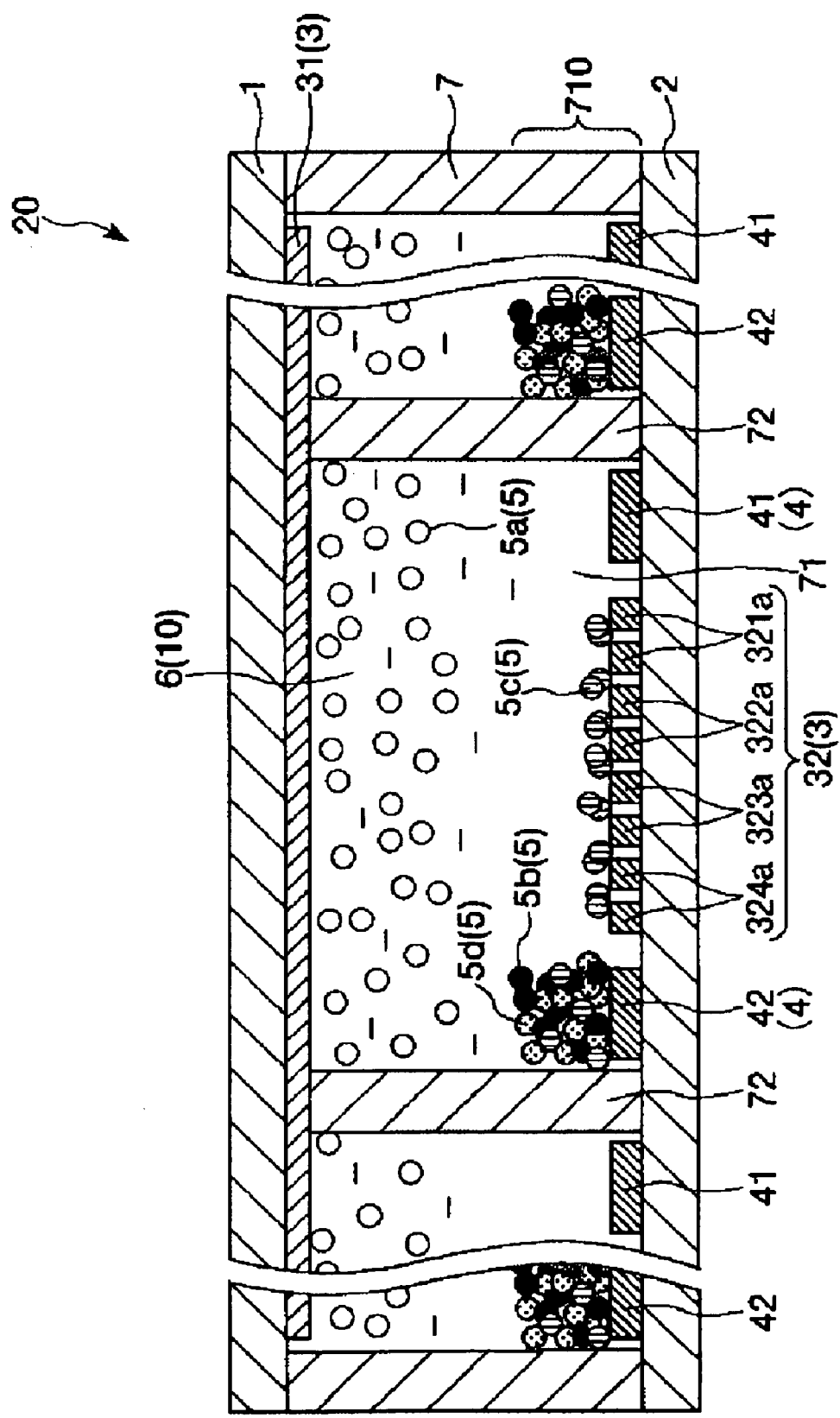
FIG. 1 is a vertical sectional pattern diagram showing a first embodiment of a display of the invention.

A display, a display method, and an electronic device according to the invention will now be described based on preferred embodiments illustrated in the accompanying drawings.

A display according to the invention includes: a planar display section, a plurality of kinds of colorants each kind which has a different color, a pixel space provided next to a side adjacent to one surface of the display section and encapsulating these colorants, an accumulation section provided in the pixel space and accumulating each of the colorants, a separation system separating a specific kind of colorant out of the accumulated colorants at the accumulation section in the pixel space, and a transfer system that selects at least one kind of colorant that has been separated and transfers this colorant to the side adjacent to the display section of the pixel space.

The separation system of this display performs separation using dielectrophoretic force generated in each colorant as a driving force.

The "dielectrophoretic force" here indicates a force exerted on particles located in a non-uniform electric field. Dipole moment that is induced to the particles existing in the electric field is influenced by this force in a predetermined direction in accordance with distribution of the electric field. In many cases, particles in the non-uniform electric field are effected by the force heading to where the electric field is strong. This force represents the dielectrophoretic force.

The magnitude of the dielectrophoretic force has a predetermined correlation to the frequency of an alternating electric field applied to the particles. This correlation generally depends on the kind of the particles.

In this case, as is the case of the present invention, when the alternating electric field of a specific frequency is applied to the plurality of kinds of colorants (particles) having different colors, the magnitude of the dielectrophoretic force generated in each colorant varies depending on the kind of colorant.

A characteristic feature of the display of the invention is that the display includes the separation system that separates the specific kind of colorant from the accumulated colorants by taking advantage of this phenomenon that the magnitude of the generated dielectrophoretic force varies depending on the kind of colorant.

With such a display, the separation system first separates the specific kind of colorant corresponding to a color to be displayed at the display section out of the plurality of kinds of colorants accumulated at the accumulation section. Then, the transfer system selects at least one kind of colorant that has been separated and transfers these particles to the side adjacent to the display section of the pixel space. As a result, either a color of a single colorant that has been transferred to the side adjacent to the display section of the pixel space or a mixed color of colors of plurality of colorants is displayed at the display section.

It is desirable that the "accumulation section" be a section provided opposite from the display section in the pixel space (a section not near the display section in the pixel space), so that the colorants located in this accumulation section cannot be easily seen from the display section. Thus, by selecting at least one kind of colorant out of the plurality of kinds of colorants and transferring this colorant to the side adjacent to the display section of the pixel space, mainly the color of the transferred colorant is seen from the display section.

Such a display allows multicolor display in one pixel space. Therefore, unlike the related art display that allows multiple color display by parallel disposition of sites (spaces) displaying different colors (e.g., yellow, magenta, and cyan, or red, green, and blue), it is possible to reduce the pixel size and thereby improve definition of the display and, further, to increase the contrast and color developability because of absence of unintended mixture of colors.

Also, according to the display of the invention, the elements do not need be accumulated unlike the related art display with which the multicolor display is made possible by accumulating elements that each displays a different color in each pixel. Therefore, it is possible to reduce parallax in display and increase the contrast by preventing attenuation of light. Further, because the elements do not need be accumulated, the display can be lighter and smaller.

First Embodiment

A first embodiment of a display and a display method of the invention will now be explained.

Figure 2:
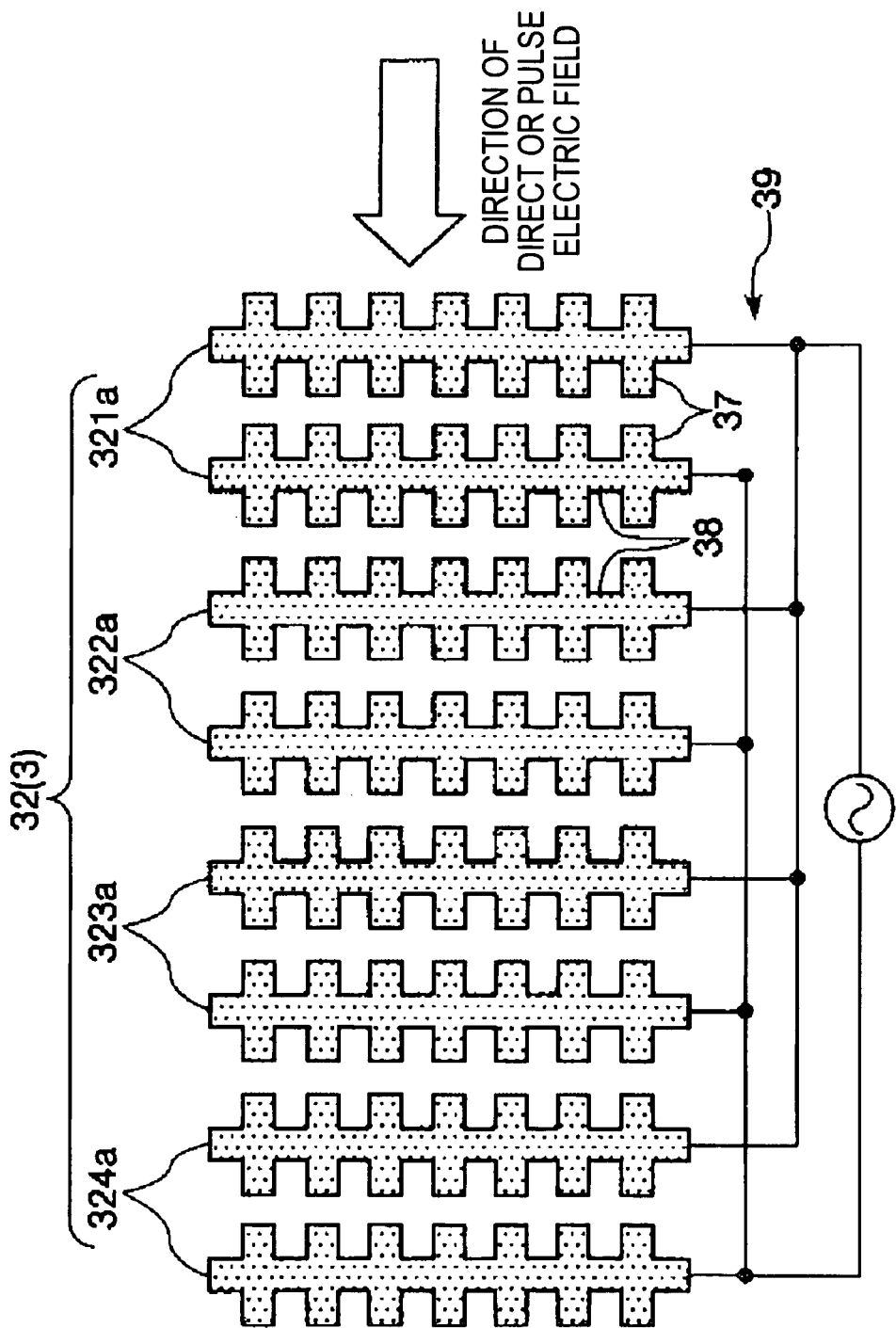
FIG. 2 is a plan diagram showing pairs of electrodes for dielectrophoresis and a circuit of the display shown in FIG. 1.

FIG. 1 is a vertical sectional pattern diagram showing the first embodiment of the display of the invention. FIG. 2 is a plan diagram showing pairs of electrodes for dielectrophoresis and a circuit of the display shown in FIG. 1. FIGS. 3 through 7 are pattern diagrams showing operating principles of the display shown in FIG. 1. For convenience sake, the following will be explained referring the top side in FIG. 1 and FIGS. 3 through 7 as "upper (on, above)" and the bottom side as "lower (under, below)."

With reference to FIG. 1, a display 20 includes: a first substrate 1 containing a display section, a second substrate 2 provided below and apart from the first substrate 1, and a sealing part 7 provided at an edge of each of the substrates 1, 2 and airtightly sealing a gap between the substrates 1, 2.

Filled in the airtight space defined by the substrates 1, 2 and the sealing part 7 is an electrophoretic dispersion liquid 10 containing electrophoretic particles 5.

The airtight space is partitioned in a matrix by partition walls 72. Each of the plurality of partitioned spaces forms a pixel space 71 that corresponds to each pixel constituting the display content. Although the plurality of pixel spaces 71 can operate simultaneously with each other, it is possible to perform display of independent colors, that is, display of multiple colors. The display 20 is thus capable of displaying information in colors, and the amount of information to be displayed increases. Therefore, various types of information such as color photographs can be displayed.

In the following, one pixel space 71 is exemplified, and constituting elements thereof will be explained one by one. The elements of the plurality of pixel spaces have the same structures.

The first and second substrates 1 and 2 defining a bottom plane and a ceiling plane of the pixel space 71 are each made of a sheet (plate) member that supports and protects members located therebetween.

The substrates 1, 2 may be flexible or hard but is preferably flexible. By use of flexible substrates 1, 2, it becomes possible to attain the display 20 having flexibility, that is, the display 20 useful for composition of electronic paper, for example.

The average thickness of the substrates 1, 2 is suitably established depending on the constituting material, usage, and the like. However, if the substrates 1, 2 are to have flexibility, the average thickness is preferably about 20 to 500 μm, and more preferably about 25 to 250 μm. It is thus possible to downsize (particularly, thinly make) the display 20 while balancing between flexibility and strength of the display 20.

Additionally, the substrate 2 includes a circuit (not shown) containing switching elements such as thin film transistors (TFTs).

Of these substrates 1, 2, the upper plane of the second substrate 2 is provided with first and second electrodes 41, 42 for electrophoresis in forms of layers (films) with a predetermined distance therebetween, and both electrodes are disposed in parallel with the first substrate 1 that is the display section. In this embodiment, the first electrode 41 is disposed near the right end of the pixel space 71 with reference to FIG. 1, and the second electrode 42 is disposed near the left end of the pixel space 71. These first and second electrodes 41, 42 for electrophoresis constitute a pair of electrodes 4 for electrophoresis. In this embodiment, the separation system includes this pair of electrodes 4 and a power supply circuit (a third circuit, not shown) for applying voltage between the pair of electrodes. Generally, a direct or pulse voltage is applied between the pair of electrodes 4. A direct or pulse electric field is thereby generated between the pair of electrodes 4.

In contrast, the lower plane of the first substrate 1 is provided with a first electrode 31 for transfer in a form of a layer (film). This first substrate 31 for transfer is provided covering the pixel space 71. In the embodiment, the first electrode 31 provided in each pixel space 71 is unified. That is, the first electrode 31 is provided on the entire lower plane of the first substrate 1 and commonly used by the plurality of pixel spaces 71.

Between the pair of electrodes 41, 42 for electrophoresis provided on the upper plane of the second substrate 2, four pairs of electrodes 321a, 322a, 323a, 324a for dielectrophoresis are placed apart from each other in this order from the right side of FIG. 1.

Referring to FIG. 2, the electrodes of the electrode pairs 321a, 322a, 323a, 324a for dielectrophoresis are lengthy in plan view and aligned substantially parallel to each other. Each electrode of the electrode pairs 321a, 322a, 323a, 324a has a concavo-convex contour with a plurality of convexes 37 and a plurality of concaves 38. The electrode pairs 321a, 322a, 323a, 324a are arranged in a manner that the convexes 37 face with each other and the concaves 38 face with each other. That is, each of the pairs 321a, 322a, 323a, 324a are constituted of lengthy interdigital electrodes aligned substantially parallel to each other, and these interdigital electrodes have a plurality of portions in which the distance between the electrodes is relatively small (portions interposed between the convexes 37) and a plurality of portions in which the distance between the electrodes is relatively large (portions interposed between the concaves 38).

Referring to FIG. 2, the longitudinal direction of the lengthy interdigital electrodes, that is, of the electrode pairs 321a, 322a, 323a, 324a for dielectrophoresis, is substantially perpendicular to a direction of the direct or pulse electric field generated by the pair of electrodes 4 for electrophoresis.

In this embodiment, with reference to FIG. 2, the separation system includes: a power supply circuit (first circuit) 39 that applies voltage to each of the four pairs of electrodes 321a, 322a, 323a, 324a and a frequency varying circuit (not shown). The frequency varying circuit is incorporated in the power supply circuit 39 and controls the frequency of the voltage applied by the power supply circuit 39 so as to change the frequency of the alternating electric field generated between each pair of the electrode pairs 321a, 322a, 323a, 324a.

Generally, an alternating voltage is applied between each pair of the electrode pairs 321a, 322a, 323a, 324a. Thus, an alternating electric field of a desired frequency is generated between each pair of the electrode pairs 321a, 322a, 323a, 324a.

When the alternating electric field is generated between each pair of the electrode pairs 321a, 322a, 323a, 324a, the electric field is generated at the portions interposed between the convexes 37 that is stronger than that generated at the portions interposed between the concaves 38. This means that each pair of the electrode pairs 321a, 322a, 323a, 324a has portions at which relatively strong alternating electric field is generated and portions at which relatively weak alternating electric field is generated between the electrodes.

When particles exists in an electric field of non-uniform strength, the particles are often influenced by the dielectrophoretic force that heads from a region of weak electric field to a region of strong electric field as described above. Therefore, the particles migrate toward the region of strong electric field (in this embodiment, towards the portions interposed between the convexes 37) due to the effect of the dielectrophoretic force.

In other words, in this embodiment, by capturing (absorbing) the particles at the portions interposed between the convexes 37, it is possible to readily separate the specific particles that have dielectrophoretically migrated out of an aggregation of the plurality of kinds of particles. These separated particles are transferred to near the display section by the transfer system which will be described hereafter, and a color of these particles performs the display at least partially at the display section.

Because each pair of the electrode pairs 321a, 322a, 323a, 324a has the plurality of portions of strong electric field and weak electric field, one electrode includes a plurality of portions of an electric field having non-uniform strength. Thus, it is possible to capture a larger number of particles and to perform the display having excellent contrast and color developability.

Also, as described, even though the pairs of electrodes 321a, 322a, 323a, 324a have the simple structure containing the plurality of portions having relatively small inter-electrode distance (the plurality of portions interposed between the convexes 37) and the plurality of portions having relatively large inter-electrode distance (the plurality of portions interposed between the concaves 38), it is possible to readily provide the strong electric field and weak electric field between the electrodes.

Further, in the embodiment, the four pairs of electrodes 321a, 322a, 323a, 324a are located in an accumulation section 710, with reference to FIG. 2. Therefore, each electrode is sufficiently set apart from the display section, thereby making it possible to suppress the particles from being seen through from the display section during the separation. It is therefore possible to suppress unwanted mixture of colors and to suppress decrease in contrast of the display at the display section.

In this embodiment, the separation system that includes the electrode pairs 321a, 322a, 323a, 324a having the configuration as shown in FIG. 2 is explained. However, as long as the separation system has a means for applying the alternating electric field of non-uniform strength to the electrophoretic particles 5, the separation system may have other configurations.

The four pairs of electrodes 321a, 322a, 323a, 324a for dielectrophoresis constitute both the first electrode 31 for transfer and a pair of electrodes 3 for transfer. That is, the four pairs of electrodes 321a, 322a, 323a, 324a for dielectrophoresis are used also as at least a part of (in this embodiment, all of) the pair of electrodes 3 constituted of the first electrode 31 and a second electrode 32 disposed opposite from the first electrode 31. There is therefore no need to separately prepare the second electrode 32 for transfer and the pairs 321a, 322a, 323a, 324a for dielectrophoresis, and it is thus possible to simplify the structure of the display 20 and to reduce the number of manufacturing processes.

Also, in this embodiment, the transfer system includes the pair of electrodes 3 for transfer and a power supply circuit (second circuit, not shown) that applies voltage between the pair of electrodes 3. Generally, a direct or pulse voltage is applied to the pair of electrodes 3. Therefore, a direct or pulse electric field is generated between the pair of electrodes 3.

Explained in this embodiment is the transfer system that transfers the electrophoretic particles 5 by the electrophoretic force. However, the transfer system may have other configuration as long as it can transfer the electrophoretic particles 5.

Also, it is possible that the electrodes 41, 42 for electrophoresis and the pairs of electrodes 321a, 322a, 323a, 324a for dielectrophoresis are, for example, a plurality of pixel electrodes coupled to a plurality of TFTs. In this case, the electrodes 31 for transfer become a common electrode corresponding to the plurality of pixel electrodes.

The constituting material for the pair of electrodes 3 for transfer (including the four pairs of electrodes 321a, 322a, 323a, 324a for dielectrophoresis) and the pair of electrodes 4 for electrophoresis may be any material as long as it is substantially conductive.

The average thickness of these electrodes 3, 4 is suitably established depending on their constituting material and usage and is, but not limited to, preferably about 0.05 to 10 μm, and more preferably about 0.05 to 5 μm.

Out of the substrates 1, 2 and the electrodes 3, 4, those disposed on the side adjacent to a display plane (in the embodiment, the first substrate 1 and the first electrode 31 for transfer) are light transmitting, that is, substantially transparent (either transparent and colorless, transparent and colored, or half transparent). Therefore, it is possible to readily and visually recognize the state of the electrophoretic particles in the electrophoretic dispersion liquid 10 which will be described hereafter, that is, to recognize the information displayed by the display 20. The information displayed by the display 20 may be, for example, letters, images, symbols, diagrams, and patterns.

Each of the electrodes 3, 4 may take a single layer structure constituted of a single body of the material as described above or a multi-layer structure constituted of a plurality of materials stacked in series. In other words, each of the electrodes 3, 4 may take a single layer structure constituted of indium tin oxide (ITO), for example, or may take a two-layer structure constituted of an ITO layer and a polyaniline layer, for example.

Provided between the substrates 1, 2 is the sealing part 7 having the shape of a frame formed along the edges of the substrates 1, 2. The sealing part 7 airtightly seals the space filled with the electrophoretic dispersion liquid 10. It is therefore possible to prevent fluid from entering into the display 20 and to prevent deterioration of the display performance of the display 20.

Provided inside the frame-shaped sealing part 7 are partition walls 72 arranged in a matrix (like lattices). The partition walls 72 divide the space inside the frame-shaped sealing part 7 into a plurality of pixel spaces arranged in a matrix, each pixel space being airtightly sealed.

Examples of the material constituting the sealing part 7 and the partition walls 72 are: various kinds of resin materials such as thermoplastic resin such as acrylic resin, urethane resin, or olefin resin, thermosetting resin such as epoxy resin, melamine resin, or phenol resin. They may be used singly or by combination of more than two of these kinds.

The distance between the substrates 1, 2 can be controlled in accordance with the thickness, (height) of the sealing part 7 and the partition walls 72.

The distance between the substrates 1, 2 is preferably about 10 to 500 μm, more preferably about 20 to 100 μm, but is not limited thereto. If the distance between the substrates 1, 2 is secured within such ranges, it is possible to prevent the thickness of the display 20 from becoming too great and, at the same time, to prevent the colors of the pair of electrodes 4 and the second electrode 32 from being seen from the side adjacent to the display section through the electrophoretic dispersion liquid 10. As a result, it is possible to prevent a decrease in contrast of the display of the display section.

The distance between the lattices of the partition walls 72 arranged in a matrix (the distance between adjacent partition walls 72) is equal to the size of the pixel of the display 20 (the size in plan view of the pixel space 71). This pixel size is suitably established depending on the content of display and is preferably from about 50 to 1000 μm, more preferably from about 100 to 400 μm, but is not limited thereto. It is therefore possible to secure the size of one pixel space 71 that is large enough to dispose the plurality of electrodes therein and, at the same time, to attain high definition in the display.

The pixel space 71 encapsulates the electrophoretic dispersion liquid 10.

This electrophoretic dispersion liquid 10 includes the plurality of kinds of electrophoretic particles 5, each kind of which has a different color, dispersed (suspended) in a liquid phase dispersion medium 6. The electrophoretic particles 5 are colorants (particles) containing dyes or pigments. The dyes may be microparticles dispersed in a dispersion medium or may be such that dissolves in a solvent.

Dispersion of the electrophoretic particles 5 into the liquid phase dispersion medium 6 is performed by a paint shaker method, a ball mill method, a media mill method, an ultrasonic dispersion method, or a stirring dispersion method. They may be used singly or by combination of two or more of these methods.

In the embodiment, dispersed in the liquid phase dispersion medium 6 is a mixture of four electrophoretic particles 5, including white particles 5a and three kinds of colored particles 5b, 5c, 5d, with each king having a different color.

The color of the white particles 5a is often used as a background color (base color) of the display. Other than the white color, the white particles 5a may suitably be used as a bright color.

In contrast, the colored particles 5b, 5c, 5d are often used as colors constituting the information to be displayed and are suitably used as a dark color, for example.

The white particles 5a may be provided if necessary, but the use thereof enhances the contrast made by the background color of the white particles 5a and colored particles 5b, 5c, 5d and, thereby, allows clearer display.

If the white particles 5a are omitted, it is preferable that the color of the liquid phase dispersion medium 6 differs from any of the colors of the colored particles 5b, 5c, 5d. In this case, also, as described above, the contrast made by the colors of the colored particles 5b, 5c, 5d and the background color of the liquid phase dispersion medium 6 is enhanced, and the display becomes clearer.

The display 20 performs the display on the display surface using a reflected light of the color of the electrophoretic dispersion liquid 10 through the transparent first substrate 1 and the first electrode 31 (the display section). The color of the electrophoretic dispersion liquid 10 is constituted of the colors of the electrophoretic particles 5 existing on the side adjacent to the first substrate 1 (the display section) of the pixel space 71 and the color of the liquid phase dispersion medium 6.

In each pixel space 71, the color of the electrophoretic dispersion liquid 10 is controlled by a method as described hereafter (the display method of the invention) in accordance with the color to be included in the content to be displayed on the display section. Specifically, in one pixel space 71 including the electrophoretic dispersion liquid 10 containing the mixture of white particles 5a and the colored particles 5b, 5c, 5d, a predetermined color is displayed at the pixel by: separating specific colored particles from the colored particles 5b, 5c, 5d in accordance with the color to be included in the content displayed on the display section, selecting at least one specific kind of particles out of the separated particles, and by attracting this at least one specific kind of particles to near the first electrode 31, that is, to the side adjacent to the display section of the pixel space 71.

Hereafter, the electrophoretic particles 5 will be described in detail.

A preferred example of the electrophoretic particles 5 is pigment particles, resin particles, or at least one kind of these composite particles.

In the embodiment, the polarity of zeta potential of each of the colored particles 5b, 5c, 5d is the same (the particles are charged to the same polarity). Therefore, for example, when the colored particles 5b, 5c, 5d are subjected to the direct or pulse electric field, each of the colored particles 5b, 5c, 5d electrophoretically migrates in the same direction. As a result, it is possible to readily control each of the colored particles 5b, 5c, 5d. Specifically, it is possible to transmit the colored particles 5b, 5c, 5d near the electrode pairs 321a, 322a, 323a, 324a and, thus, to efficiently separate the specific colored particles from the colored particles 5b, 5c, 5d.

In this case, the polarity of zeta potential of the white particles 5a is preferably opposite the polarity of zeta potential of each of the colored particles 5b, 5c, 5d or substantially zero. When the polarity of the white particles 5a is opposite the polarity of zeta potential of each of the colored particles 5b, 5c, 5d, the white particles 5a migrate in a reverse direction from the colored particles 5b, 5c, 5d. Thus, the color of the white particles 5a becomes the background color of the colors of the colored particles 5b, 5c, 5d. Also, if the polarity of zeta potential of each of the colored particles 5b, 5c, 5d is substantially zero, the white particles 5a do not migrate but stay dispersed in the liquid phase dispersion medium 6. Therefore, when the colored particles 5b, 5c, 5d do not exist near the first electrode 31 of the pixel space 71 (the side adjacent to the display section of the pixel space 71), the white display (background color display) is displayed at the display section.

The magnitude of zeta potential, that is, the charge amount, of the electrophoretic particles 5 is controlled by forming a polymer graft layer containing polymers on the surfaces of the electrophoretic particles 5 and by adjusting the density of a polar group to be introduced to this layer.

In this case, the polymers contained in the polymer graft layer are preferably highly compatible to the liquid phase dispersion medium 6. Accordingly, the affinity of the electrophoretic particles 5 to the liquid phase dispersion medium 6 increases, and it becomes possible to reduce a resistive force exerted on the electrophoretic particles 5 when migrating in the liquid phase dispersion medium 6. For such polymers, various types of coupling agents are used, for example.

The colors of the colored particles 5b, 5c, 5d are combinations of Y (yellow), M (magenta), and C (cyan), or R (red), G (green), and B (blue), for example. Accordingly, the so-called color display is possible.

The average particle diameter of the colored particles 5b, 5c, 5d is preferably about 0.01 to 10 μm, and more preferably about 0.05 to 7.5 μm. The particle diameter of the white particles 5a is preferably about 0.05 to 10 μm, and more preferably about 0.1 to 3 μm. By setting the average particle diameter of the electrophoretic particles 5 such as the colored particles 5b, 5c, 5d and the white particles 5a within these ranges, it is possible to reliably prevent aggregation of the electrophoretic particles 5 and sedimentation of the particles 5 in the liquid phase dispersion medium 6, and to thereby suitably prevent deterioration of the display quality of the display 20.

The liquid phase dispersion medium 6 is preferably such that has a relatively high insulating property.

Examples of various kinds of additives that may be added to the liquid phase dispersion medium 6 (the electrophoretic dispersion liquid 10), if necessary, are: a charge controlling agent constituted of, e.g., particles of electrolyte, surfactant, metal soap, resin material, rubber material, oil, varnish, or a compound; a dispersion agent such as a titanium coupling agent, aluminum coupling agent, and a silane coupling agent; a lubricant; and a stabilizing agent.

Further, if necessary, dyes may be dissolved in the liquid phase dispersion medium 6.

Additionally, the liquid phase dispersion medium 6 may be substituted with a gas phase dispersion medium.

The operation (behavior) of such a display 20, that is, the first embodiment of the display of invention, will now be explained.

As one example of the operation of the display 20, one pixel space 71 is exemplified regarding the operation that begins with an initial state displaying the white display and transfers to a display state displaying the color of the colored particles 5c.

In this embodiment, zeta potential of the white particles 5a is substantially zero, and the polarity of zeta potential of each of the colored particles 5b, 5c, 5d is positive (positively charged).

The magnitude of the dielectrophoretic force generated in each of the colored particles 5b, 5c, 5d upon receipt of the alternating electric field of a specific frequency differs from one another. In other words, with each of the colored particles 5b, 5c, 5d, the frequency of the alternating electric field at which the maximum dielectrophoretic force is generated differs depending on the kind of the colored particles.

1A: In the initial state, a direct or pulse voltage is applied between the first electrode 31 for transfer and the first electrode 41 for electrophoresis so that the potential of the first electrode 41 becomes lower than that of the first electrode 31. Accordingly, a direct or pulse electric field that heads from the first electrode 31 to the first electrode 41 is generated in the pixel space 71. Then, under the influence of this electric field, the colored particles 5b, 5c, 5d gather near the first electrode 41, with reference to FIG. 3A. In this initial state, because the reflected light of the white particles 5a that are diffused in substantially entire pixel space 71 is viewed at the display section, the display becomes the white display.

2A: Then, a direct or pulse voltage is applied between the pair of electrodes 4 for electrophoresis so that the potential of the second electrode 42 for electrophoresis becomes lower than that of the first electrode 41. Accordingly, a direct or pulse electric field heading from the first electrode 41 to the second electrode 42 is generated in the pixel space 71. Then, under the influence of the electric field, each of the colored particles 5b, 5c, 5d that has gathered near the first electrode 41 starts migrating toward the second electrode 42, with reference to FIG. 3B.

In this case, although the direct voltage may be continuously applied between the pair of electrodes 4, it is preferable to apply a pulse voltage for a short period of time. The power consumed by the voltage application is thereby reduced and, at the same time, the colored particles 5b, 5c, 5d can be migrated sufficiently. Also, the application of the pulse voltage, as compared to the continuous application of the direct voltage, better suppresses property changes and deterioration of the electrophoretic particles 5 and the liquid phase dispersion medium 6 caused by the behavior of the electric field.

In this embodiment, as described earlier, the polarity of zeta potential of each of the colored particles 5b, 5c, 5d is the same. Therefore, when the pair of electrodes 4 receives voltage and is subjected to the electric field, the colored particles 5b, 5c, 5d migrate in the same direction.

Also, as described earlier, the pair of electrodes 4 is provided on the upper plane of the second substrate 2. Because the pair of electrodes 4 is sufficiently separated from the first substrate 1 (display section), the colors of these particles cannot be seen from the side adjacent to the display section of the display 20 in the process of separating the colored particles 5b, 5c, 5d from each other as described hereinbefore. Therefore, in the display at the display section, it is possible to suppress the unwanted mixture of the colors and to suppress decrease in the contrast in the display.

In this embodiment, a region on the side adjacent to the second substrate 2 of the pixel space 71 is referred to as "accumulation section 710." The accumulation section 710 is a region for accumulating each particle in step 1A and for separating the specific colored particles in step 2A. The accumulation section is located in a region apart from the display section of the pixel space 71 so that the color of each particle located at the accumulation section 710 cannot be seen from the side adjacent to the display section of the display 20, as described above. It is therefore not possible to see from the display section the process of separating the specific colored particles out of the accumulated colored particles 5b, 5c, 5d; however, by selecting at least one kind of colored particles out of the separated specific colored particles and transferring these particles to the side adjacent to the display section of the pixel space 71, that is, to the side adjacent to the first electrode 1, as in a process to be described hereafter, the colors of the transferred colored particles are displayed at the display section.

3A: Next, during migration of the colored particles 5b, 5c, 5d to the second electrodes 42, an alternating electric field of a predetermined frequency is applied between each pair of the four pairs of electrodes 321a, 322a, 323a, 324a for dielectrophoresis. The alternating electric field of a predetermined frequency is thereby generated between the electrodes.

Because the color to be displayed at the display section is the color of the colored particles 5c in this case, the alternating voltage to be applied between the electrodes is set to have a specific frequency at which the dielectrophoretic force generated in the colored particles 5c is greater than those generated in the other colored particles (the colored articles 5b, 5d). When the alternating voltage of such a specific frequency is applied between the electrodes, a dielectrophoretic force of different magnitude is generated in each of the colored particles 5b, 5c, 5d between the electrodes. In this embodiment, as described hereinbefore, a particularly strong dielectrophoretic force is generated in the colored particles 5c, but hardly any dielectrophoretic force or only a relatively weak dielectrophoretic force is generated in the colored particles 5b, 5d.

Figure 4A:
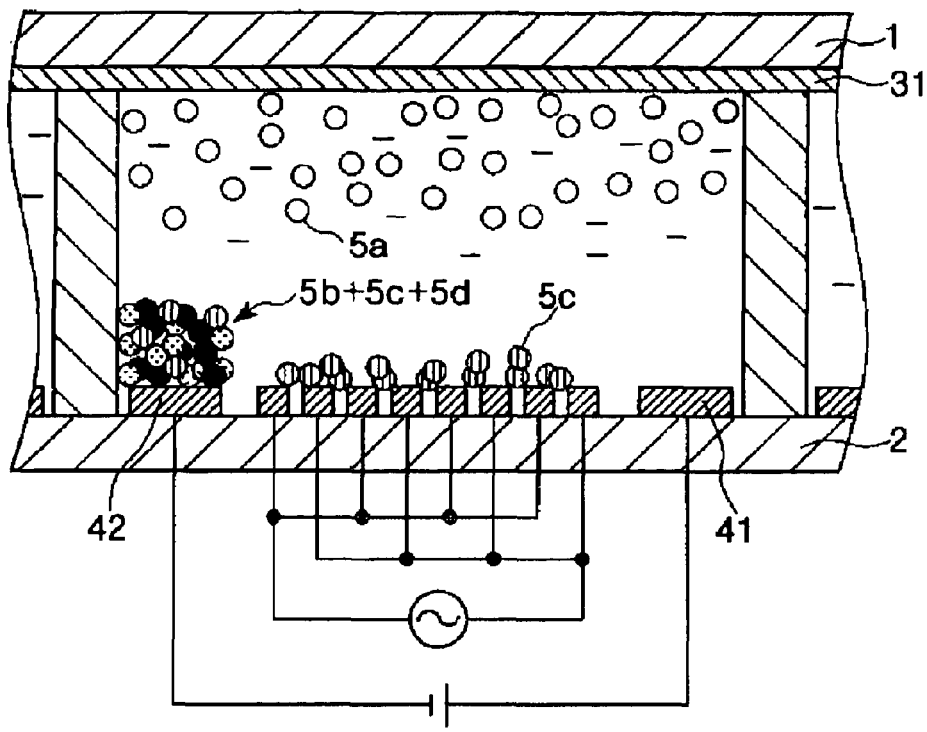
FIGS. 4A and 4B are pattern diagrams showing operating principles of the display shown in FIG. 1.

As described, when a large dielectrophoretic force is exerted selectively on the colored particles 5c during migration of the colored particles 5b, 5c, 5d, the colored particles 5c are captured (absorbed) between the four pairs of electrodes 321a, 322a, 323a, 324a, and the colored particles 5c are separated out of the aggregation of the colored particles 5b, 5c, 5d, with reference to FIG. 4A. Consequently, the colored particles 5c can be efficiently separated out of the colored particles 5b, 5c, 5d.

In this case, it is preferable that the dielectrophoretic force generated in the colored particles 5c be as large as possible and larger than the electrophoretic force generated by the action of the direct or pulse electric field.

Specifically, it is preferable to apply to the colored particles 5c an alternating electric field of the predetermined frequency that generates the maximum dielectrophoretic force in the particles 5c.

Figure 4B:
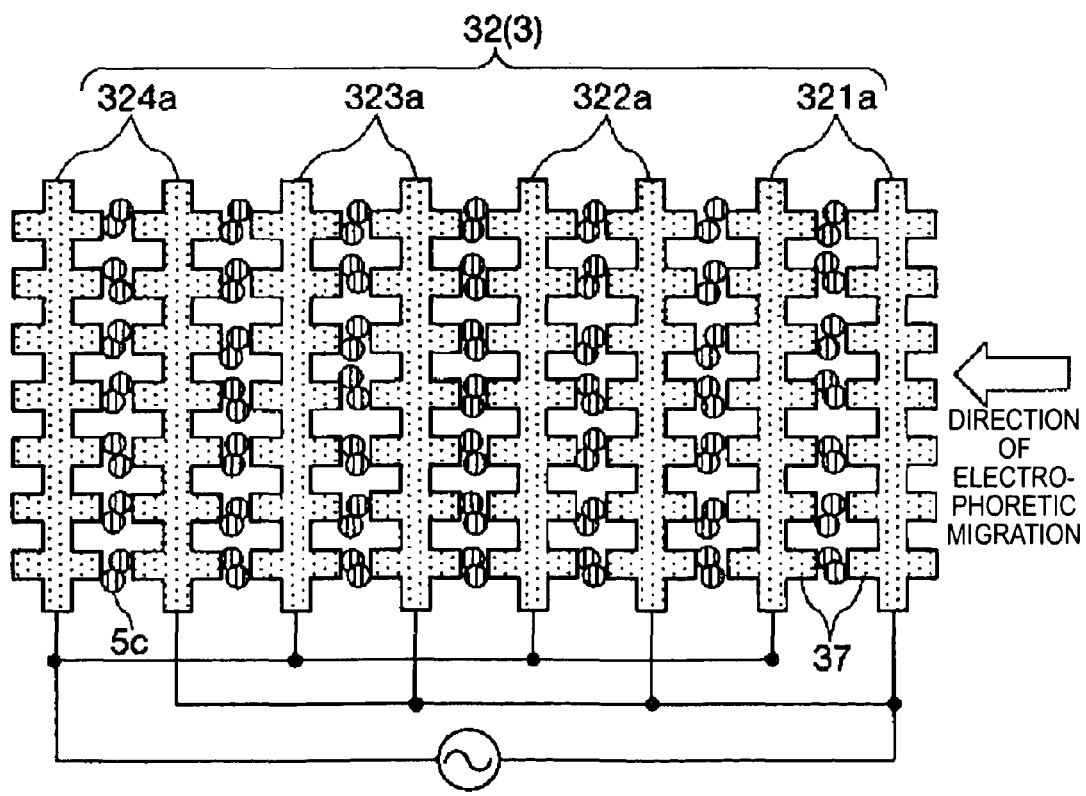

In this case, referring to FIG. 4B, the colored particles 5c are captured (absorbed) at the portions interposed between the convexes 37 in the pairs of electrodes 321a, 322a, 323a, 324a for dielectrophoresis. This is because, as previously described, the electric field generated at the portions interposed between the convexes 37 is greater than that generated at the portions interposed between the concaves 38, and because such a force is generated in the colored particles 5c that migrates the particles 5c to the portions interposed between the convexes 37.

Figure 3A:
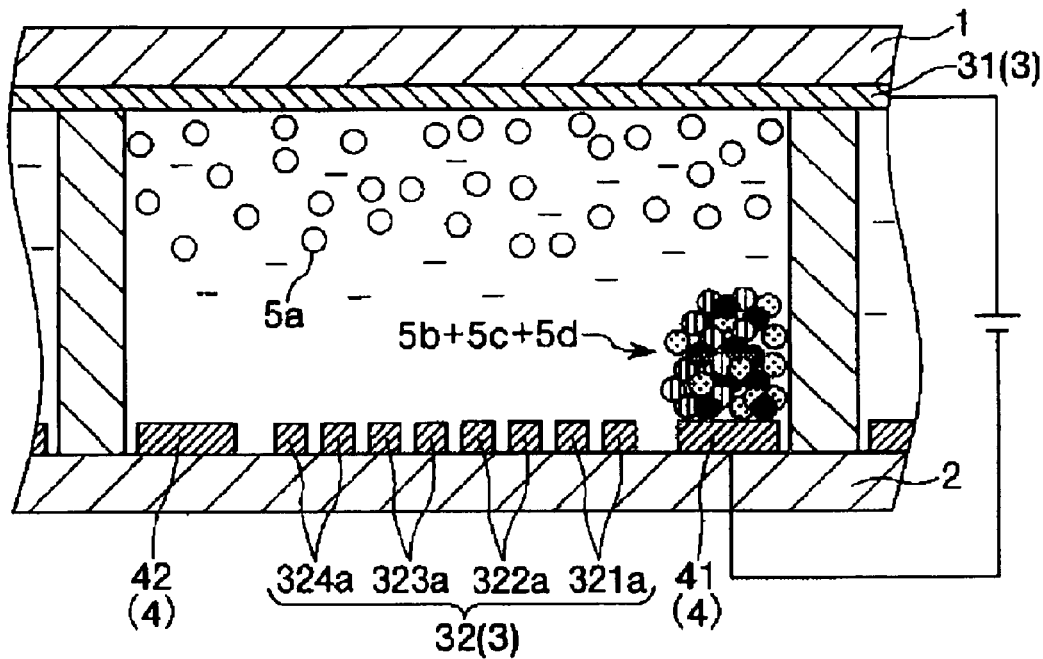
FIGS. 3A and 3B are pattern diagrams showing operating principles of the display shown in FIG. 1.
Figure 3B:
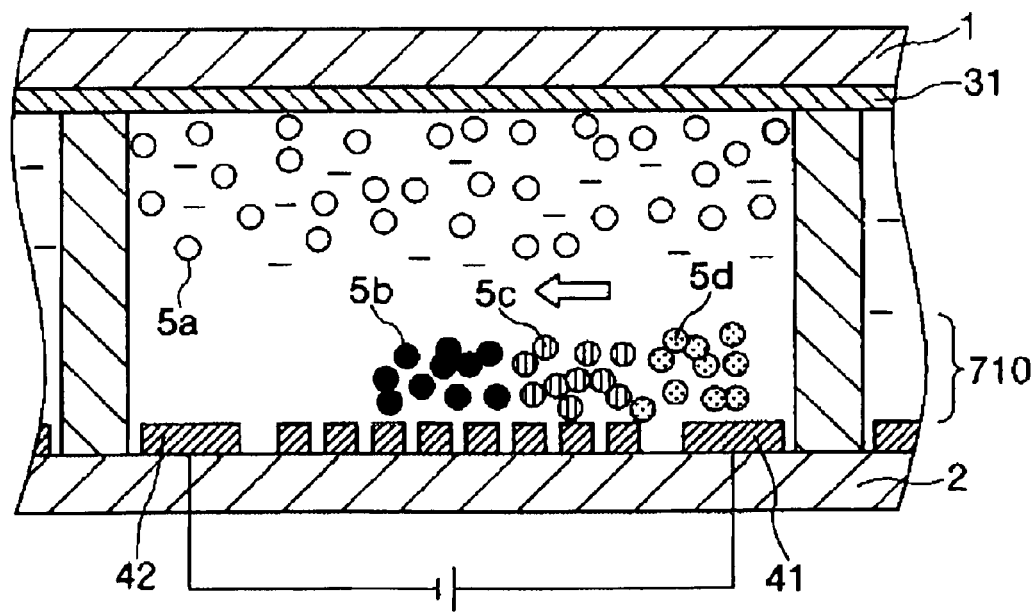

With reference to FIGS. 3B and 4A, the colored particles 5b, 5c, 5d are subjected to the dielectrophoretic force generated by the pairs of electrodes 321a, 322a, 323a, 324a during migration from the first electrode 41 to the second electrode 42. It is therefore possible to exert the dielectrophoretic force uniformly on the entire aggregation of the colored particles 5b, 5c, 5d as if scanning this aggregation. As a result, it is possible to increase the rate of separation of the colored particles 5c separated from the colored particles 5b, 5c, 5d.

Referring to FIG. 4B, the pairs of electrodes 321a, 322a, 323a, 324a take the lengthy interdigital shapes, and their longitudinal direction is substantially perpendicular to the direction of the electrophoretic migration of the colored particles 5b, 5c, 5d. Therefore, the entire aggregation of the colored particles 5b, 5c, 5d is subjected a more uniform dielectrophoretic force.

Further, because it is possible to capture (absorb) the colored particles 5b, 5c, 5d and distribute the same throughout the entire pixel space 71, a greater number of colored particles 5b, 5c, 5d can be captured. Accordingly, the display contrast and color developability by the display 20 can be increased.

Additionally, both the portions interposed between the convexes 37 and the portions interposed between the concaves 38 of the pairs of electrodes 321a, 322a, 323a, 324a, with reference to FIG. 4B, are substantially uniformly distributed throughout the pixel space 71. Therefore, more uniform dielectrophoretic force is generated in the colored particles 5c that are diffused in the pixel space 71. Consequently, it is possible to shorten the distance of migration of the colored particles 5c diffused in the entire pixel space 71 under the influence of the dielectrophoretic force and to capture the colored particles 5c in a short period of time. Also, in the process as described hereunder, because the colored particles 5c cover the entire display section when the captured particles 5c have transferred to the side adjacent to the display section, it is an advantage that the display can be performed with excellent contrast and color developability.

After the separation of the colored particles 5c, the colored particles 5b, 5d that remained unseparated gather near the second electrodes 42, with reference to FIG. 4A.

As set forth, in the separation of the specific kind of colored particles 5c out of the plurality of kinds of colored particles 5b, 5c, 5d, the display 20 separates the particles 5c by setting the frequency of the alternating electric field to be applied to the colored particles 5b, 5c, 5d. Thus, by frequently varying the frequency of the alternating electric, it is possible to increase the number of kinds of separable colored particles.

In other words, even if the electrophoretic dispersion liquid 10 contains a plurality of kinds of colored particles, it is readily possible to separate the specific kind of colored particles out of the plurality of kinds of colored particles, provided that the specific frequency of the alternating electric field that exerts the maximum dielectrophoretic force on each particle differs from one another.

Additionally, not all of the colored particles 5c must be separated out of the aggregation of the colored particles 5b, 5c, 5d. In this embodiment, with reference to FIG. 4A, unseparated colored particles 5c remain near the second electrode 4 together with the colored particles 5b, 5d.

Note that the specific frequency of the alternating electric field that generates the maximum dielectrophoretic force in each of the colored particles 5b, 5c, 5d may be suitably adjusted by setting conditions for each of the colored particles 5b, 5c, 5d or conditions for the liquid phase dispersion medium 6.

Specifically, the specific frequency of the alternating electric field that exerts the maximum dielectrophoretic force on the colored particles 5b, 5c, 5d may be suitably adjusted by setting at least one condition out of the conditions such as size, constituting material, and configuration of the colored particles 5b, 5c, 5d, and constituting material of the liquid phase dispersion medium 6. By adjusting the specific frequency by such a method, it is possible to readily adjust the specific frequency of each of the colored particles 5b, 5c, 5d and to have a sufficient difference between the specific frequencies. As a result, it is possible to improve separation performance when separating the specific colored particles out of the colored particles 5b, 5c, 5d.

In other words, in order to secure the sufficient difference between the specific frequencies of the alternating electric fields when the maximum dielectrophoretic forces are exerted on the colored particles 5b, 5c, 5d, at least one condition out of the conditions such as size, constituting material, and configuration of the colored particles 5b, 5c, 5d, and constituting material of the liquid phase dispersion medium 6 is suitably established. It is thereby possible to prevent unintended generation of the dielectrophoretic force not only in the colored particles to be migrated but also in the other colored particles.

It is preferable that the configuration of each of the colored particles 5b, 5c, 5d is substantially spherical, as in this embodiment, but is not limited thereto. Accordingly, because it is possible to suppress anisotropy of the dielectrophoretic force exerted on the colored particles 5b, 5c, 5d, which is associated with configurational anisotropy of each colored particle, it is possible to reduce variation in the migration speed that is dependent on the migration direction.

4A: Next, a direct or pulse voltage is applied between the pair of electrodes 3 for transfer in order to lower the potential of the first electrode 31 for transfer than that of the second electrode 32 for transfer. Consequently, the direct or pulse electric field that heads from the second electrode 32 to the first electrode 31 is generated in the pixel space 71. Under the influence of this electric field, the colored particles 5c captured near the second electrode 32 start migrating to the first electrode 31, with reference to FIG. 5A.

As described, by transferring the particles using the electrophoretic force, the specific colored particles can be selectively and readily transferred even with the relatively simple structure having the pair of electrodes 3 for transfer and the circuit.

Figure 5A:
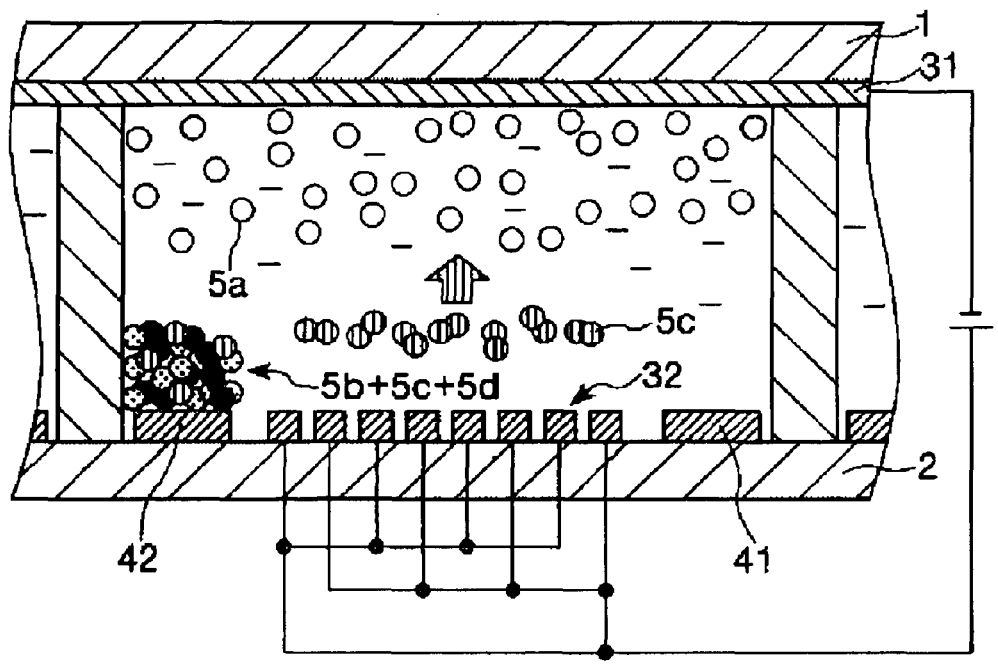
FIGS. 5A and 5B are pattern diagrams showing operating principles of the display shown in FIG. 1.
Figure 5B:
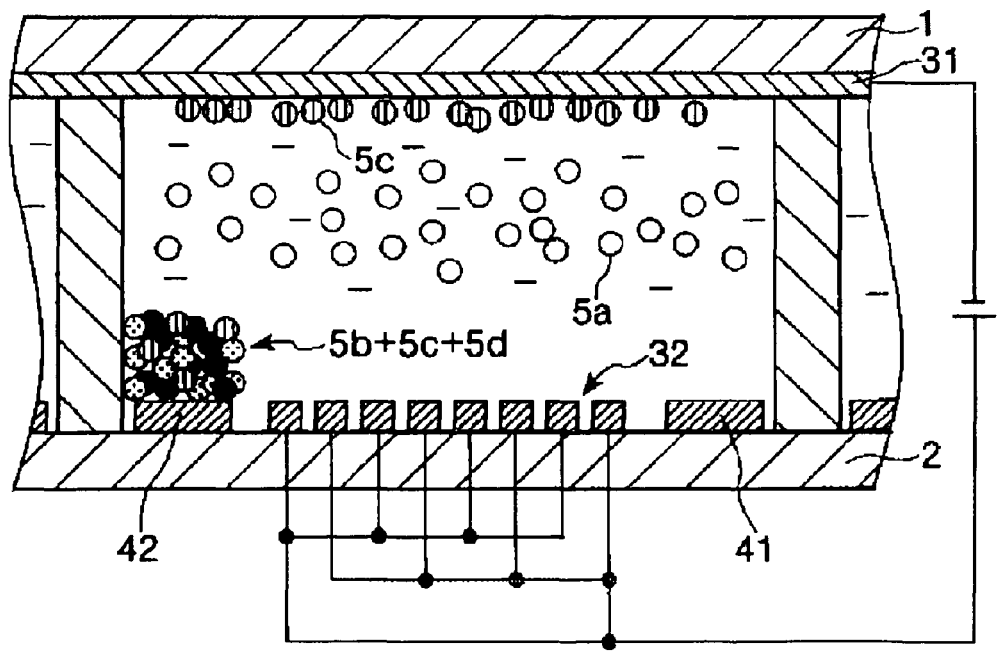

5A: With reference to FIG. 5B, the colored particles 5c that have started the electrophoretic migration migrate while pushing away the white particles 5a and reach near the first electrode 31. As a result, the content (display color) displayed at the display section changes from the color of the white particles 5a to the color of the colored particles 5c. That is, the initial state of the white display is transferred to the display state.

By controlling the series of operations in the plurality of pixel spaces 71 cooperatively so as to control each display color independently, a display of desired content can be performed.

In step 4A above, although the direct voltage may be continuously applied between the pair of electrodes 3, it is preferable to apply the pulse voltage for a short period of time. This makes it possible to sufficiently migrate the colored particles 5b, 5c, 5d while reducing the power consumed by the voltage application. Also, the application of the pulse voltage, as compared to the continuous application of the direct voltage, better suppresses property changes and deterioration of the electrophoretic particles 5 and the liquid phase dispersion medium 6 caused by the action of the electric field.

The ratio of the electrophoretic particles 5 is preferably set substantially equal to the ratio of the liquid phase dispersion medium 6. Thus, the electrophoretic particles 5 can remain at a certain location in the liquid phase dispersion medium 6 for a long time even after the voltage application is finished in step 4A. As a result, the information displayed at the display section of the display 20 is maintained for a long time without consuming electricity.

Further, from this display state, it is possible to return to the initial state by carrying out the operation of step 1A.

Through the processes above, the initial state of the display 20 can be transferred to the display state. In this embodiment, however, the following step will continue. This step may be conducted if necessary, or it may be omitted if, for example, all the colored particles 5c were separated out of the aggregation of the colored particles 5b, 5c, 5d in step 3A.

Figure 6A:
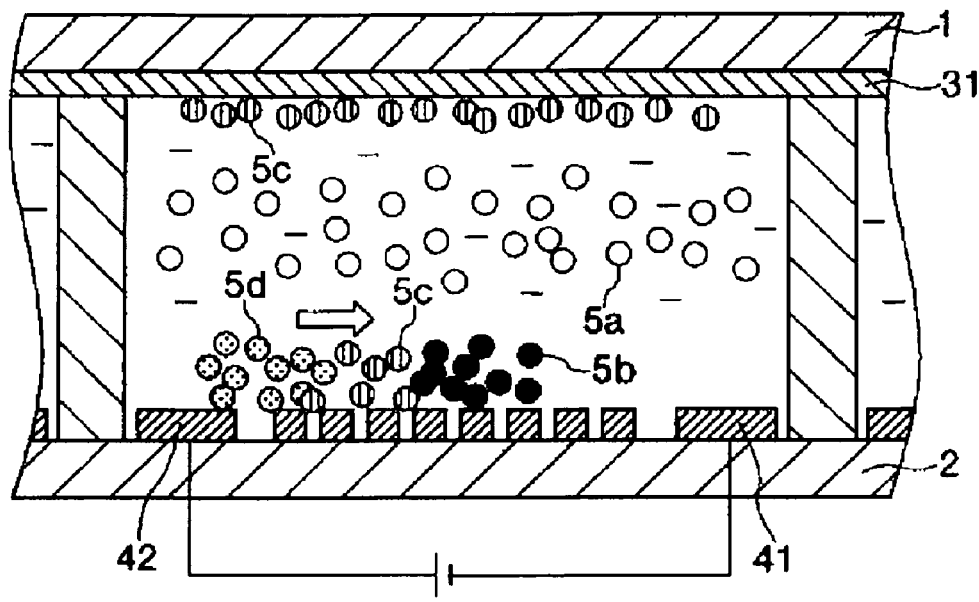
FIGS. 6A and 6B are pattern diagrams showing operating principles of the display shown in FIG. 1.

6A: A direct or pulse voltage is applied between the pair of electrodes 4 for electrophoresis so that the potential of the first electrode 41 for electrophoresis becomes lower than that of the second electrode 42 for electrophoresis. As a consequence, the direct or pulse electric field that heads from the second electrode 42 to the first electrode 41 is generated in the pixel space 71. With reference to FIG. 6A, under the influence of this electric field, each of the colored particles 5b, 5c, 5d that gathered near the second electrode 42 starts migrating to the first electrode 41.

7A: An alternating voltage of the same frequency as that in step 3A is applied between the four pairs of electrodes 321a, 322a, 323a, 324a during migration of the colored particles 5b, 5c, 5d to the first electrode 41. The alternating electric field of a predetermined frequency is thereby generated between the electrodes. As a result, as in step 3A, the colored particles 5c are captured at each pair of electrodes 321a, 322a, 323a, 324a, with reference to FIG. 6B.

Through this step, the colored particles 5c that were not separated in step 3A can be newly separated.

Figure 6B:
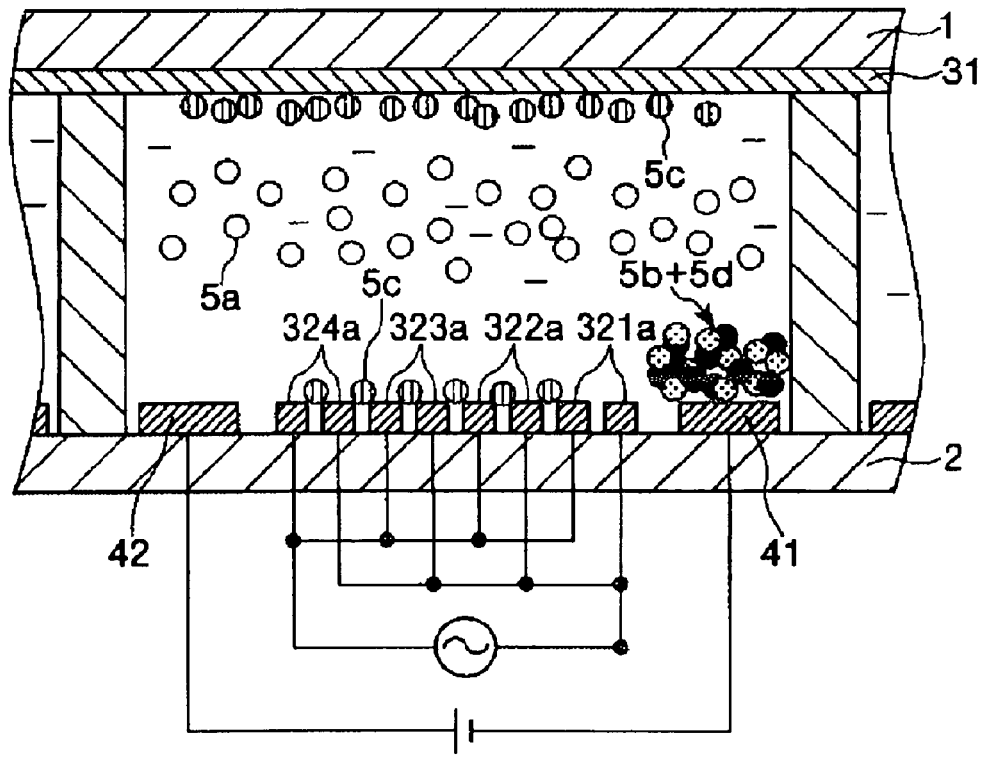

After the colored particles 5c are separated, the colored particles 5b, 5d that remained unseparated gather near the first electrode 41, with reference to FIG. 6B.

8A: Similarly to step 4A, a direct or pulse voltage is applied between the pair of electrodes 3 for transfer so that the potential of the first electrode 31 for transfer becomes lower than that of the second electrode 32 for transfer. As a consequence, a direct or pulse electric field that heads from the second electrode 32 to the first electrode 31 is generated in the pixel space 71. Under the influence of this electric field, with reference to FIG. 7A, the colored particles 5c captured near the second electrode 32 start migrating to the first electrode 31.

Figure 7A:
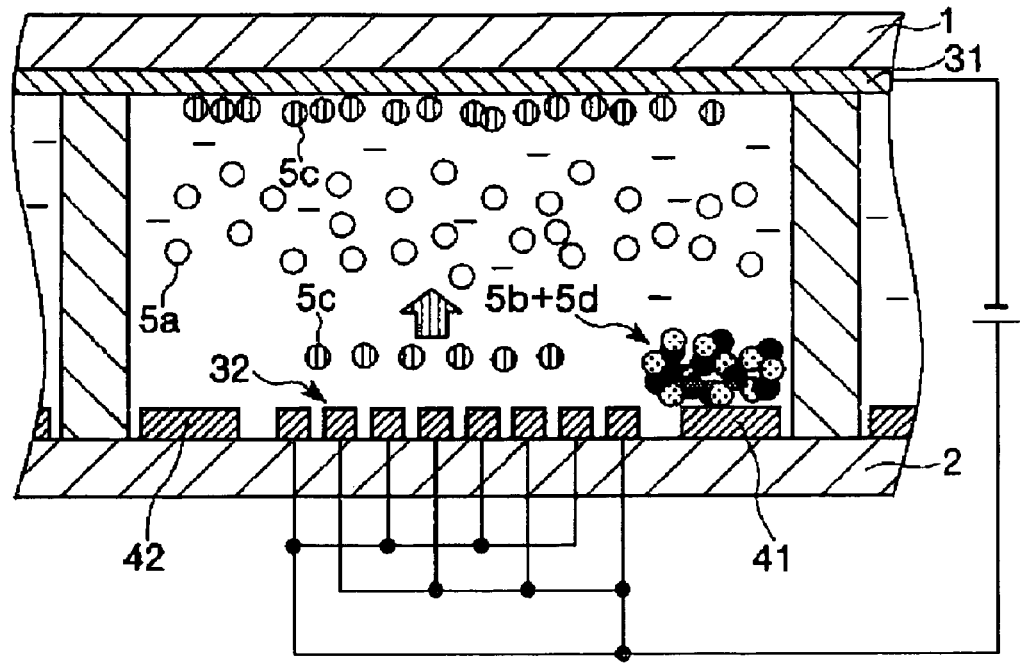
FIGS. 7A and 7B are pattern diagrams showing operating principles of the display shown in FIG. 1.
Figure 7B:
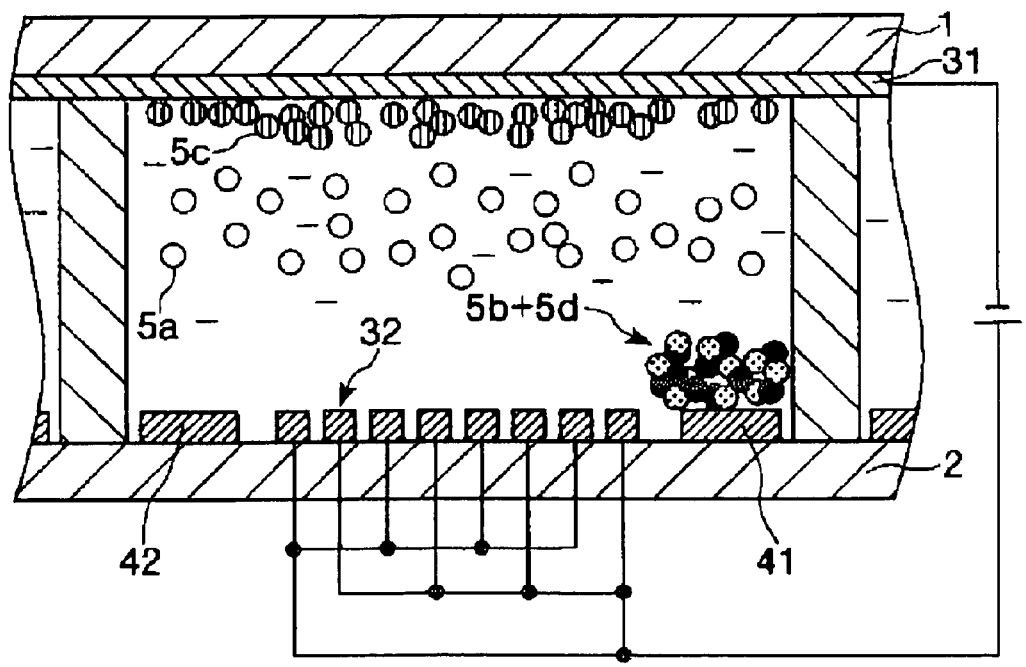

9A: With reference to FIG. 7B, the colored particles 5c that started the electrophoretic migration migrate while pushing away the white particles 5a and reach near the first electrode 31. As a consequence, these colored particles 5c join with the colored particles 5c that had already arrived near the first electrode 31 while increasing the density of the particles 5c throughout the display section. As a result, in the display state in step 5A, the light reflectance of the colored particles 5c further increases, and the display performance such as the contrast improves further.

Through the steps above, it is possible to transfer the initial state of the white display to the display state having excellent display performance.

Additionally, the white display may be attained by scattering light using transparent and colorless particles. In this case, it is preferable that the density (content rate) of the particles in the electrophoretic dispersion liquid 10 is sufficiently high. Also, it is preferable that the thickness of the pixel space 71 (distance between the substrates 1, 2) is sufficiently large. Accordingly, because the particles in the pixel space 71 are set far from the display section, the white display with high whiteness is performed at the display section. Although the pair of electrodes 4 (the separation system) is provided in the accumulation section 710 located on the side adjacent to the second substrate 2 of the pixel space 71 in this embodiment, the accumulation section 710 may be located at any place as long as it is not located near the display section of the pixel space 71. By use of the colorless and transparent particles, it is possible to perform the white display at the display section even if the accumulation section 710 is not located on the side adjacent to the second substrate 2.

The display 20 as described above is capable of multicolor display in a single pixel space. Therefore, the pixel size is reduced, and the definition and contrast of the display is increased.

Further, as the parallax in the display 20 is reduced, the display 20 is also made lighter and smaller.

Second Embodiment

A second embodiment of the display method of the invention will now be explained.

FIGS. 8A, 8B, 9A, 9B are diagrams (vertical sectional diagrams) to explain the second embodiment exemplifying the display method of the invention. For convenience sake, the following will be explained referring the top side in FIGS. 8A through 9B as "upper (on, above)" and the bottom side as "lower (under, below)."

Although the second embodiment will be described below, mainly differences from the first embodiment will be explained, and explanation of the similar content will not be repeated.

The display method according to the embodiments of the invention is similar to the first embodiment described above, except that the display state is such that a mixed color of the colors of the plurality of kinds of colored particles is displayed.

As one example of the operation of the display 20 (the second embodiment of the display method of the invention), one pixel space 71 will be described concerning the operation that begins with the initial state displaying the white display and transfers to the display state displaying a mixed color of the color of the colored particles 5c and the color of the colored particles 5d.

Described first is the display state in which the color of the colored particles 5c is displayed in similar manners as the previous steps 1A through 5A in the first embodiment.

Figure 8A:
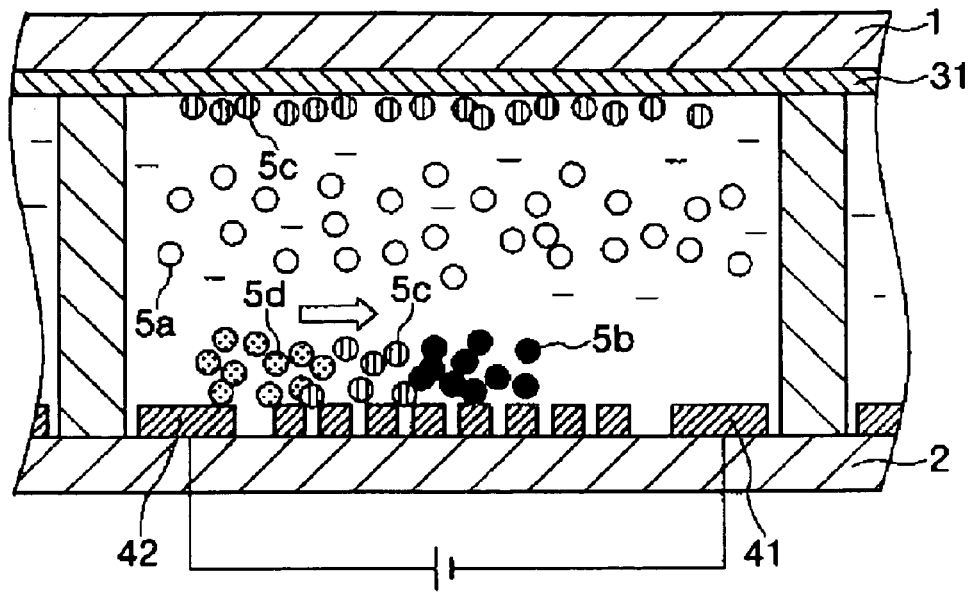
FIGS. 8A and 8B are diagrams (vertical sectional diagrams) to explain a second embodiment of a display method of the invention.
Figure 8B:
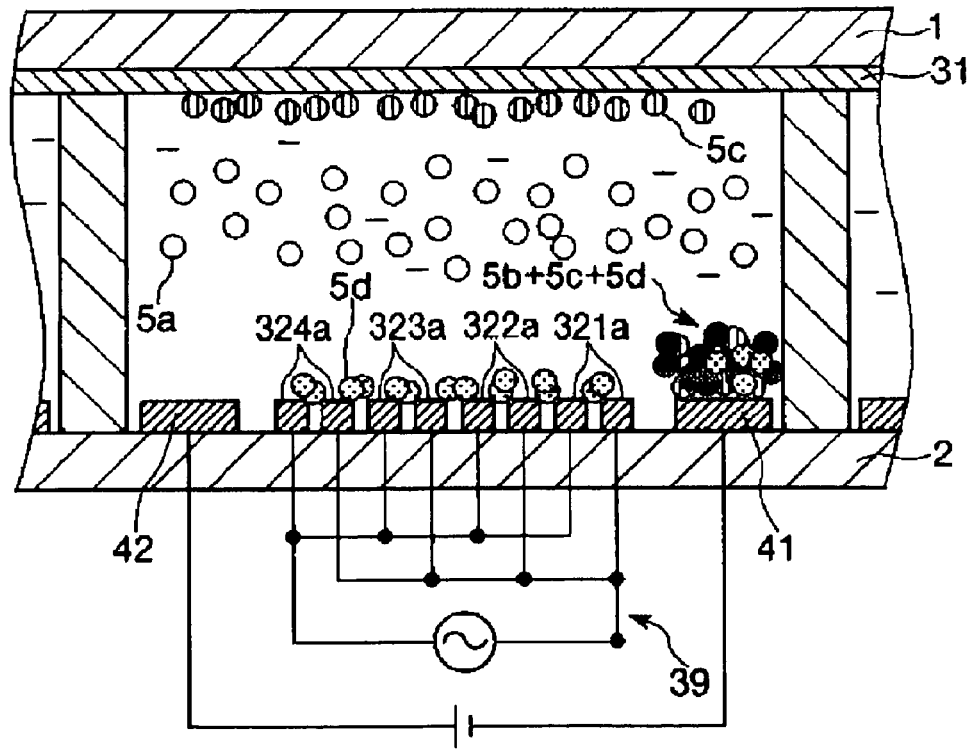

6B: A direct or pulse voltage is next applied between the pair of electrodes 4 for electrophoresis so that the potential of the first electrode 41 for electrophoresis becomes lower than that of the second electrode 42 for electrophoresis. Consequently, the direct or pulse electric field that heads from the second electrode 42 to the first electrode 41 is generated in the pixel space 71. With reference to FIG. 8A, under the influence of this electric field, the colored particles 5b, 5c, 5d that gathered near the second electrode 42 start migrating to the first electrode 41.

7B: An alternating voltage of a different frequency from that in the previous step 3A is then applied between the four pairs of electrodes 321a, 322a, 323a, 324a during migration of the colored particles 5b, 5c, 5d to the first electrode 41. The alternating electric field of a predetermined frequency is thereby generated between the electrodes. In this case, the frequency varying circuit (not shown) incorporated in the power supply circuit 39 shown in FIG. 8B establishes the frequency of the alternating voltage to be applied between the four pairs of electrodes 321a, 322a, 323a, 324a, in a manner that this frequency differs from the frequency in the case of step 3A.

In this case, because the color displayed at the display section is the mixed color of the color of the colored particles 5c and the color of the colored particles 5d, the alternating voltage to be applied between the electrodes is such that has a specific frequency at which the dielectrophoretic force generated in the colored particles 5d is stronger than that generated in the other colored particles (colored particles 5b, 5c). When the alternating voltage of such a specific frequency is applied between the electrodes, a particularly strong dielectrophoretic force is generated in the colored particles 5d between the electrodes, and hardly any dielectrophoretic force or only a relatively weak dielectrophoretic force is generated in the colored particles 5b, 5c. Thus, when a large dielectrophoretic force is exerted selectively on the colored particles 5d during the migration of the colored particles 5b, 5c, 5d, the colored particles 5d are captured (absorbed) between the four pairs of electrodes 321a, 322a, 323a, 324a and separated out of the aggregation of the colored particles 5b, 5c, 5d, with reference to FIG. 8B After the colored particles 5*d* are separated, the colored particles 5*b*, 5*c* left unseparated gather near the first electrode 41, with reference to FIG. 8B.

8B: Similarly to step 4A, a direct or pulse voltage is applied between the pair of electrodes 3 for transfer so that the potential of the first electrode 31 for transfer becomes lower than that of the second electrode 32 for transfer. As a consequence, with reference to FIG. 9A, the colored particles 5*d* that were captured near the second electrode 32 start migrating to the first electrode 31.

Figure 9A:
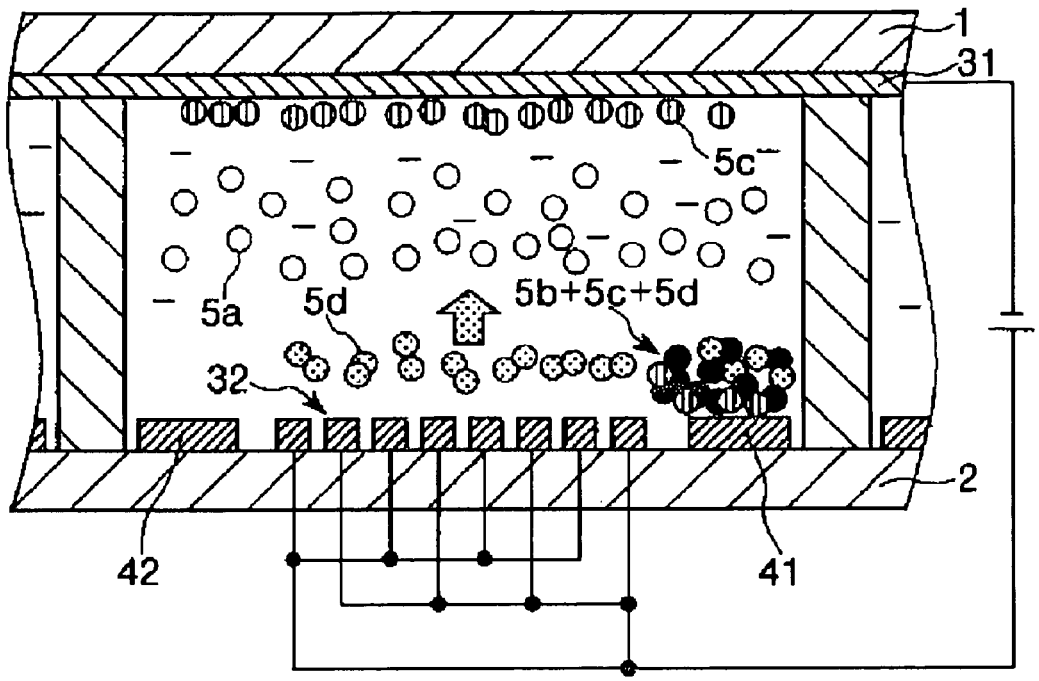
FIGS. 9A and 9B are diagrams (vertical sectional diagrams) to explain the second embodiment of the display method of the invention.
Figure 9B:
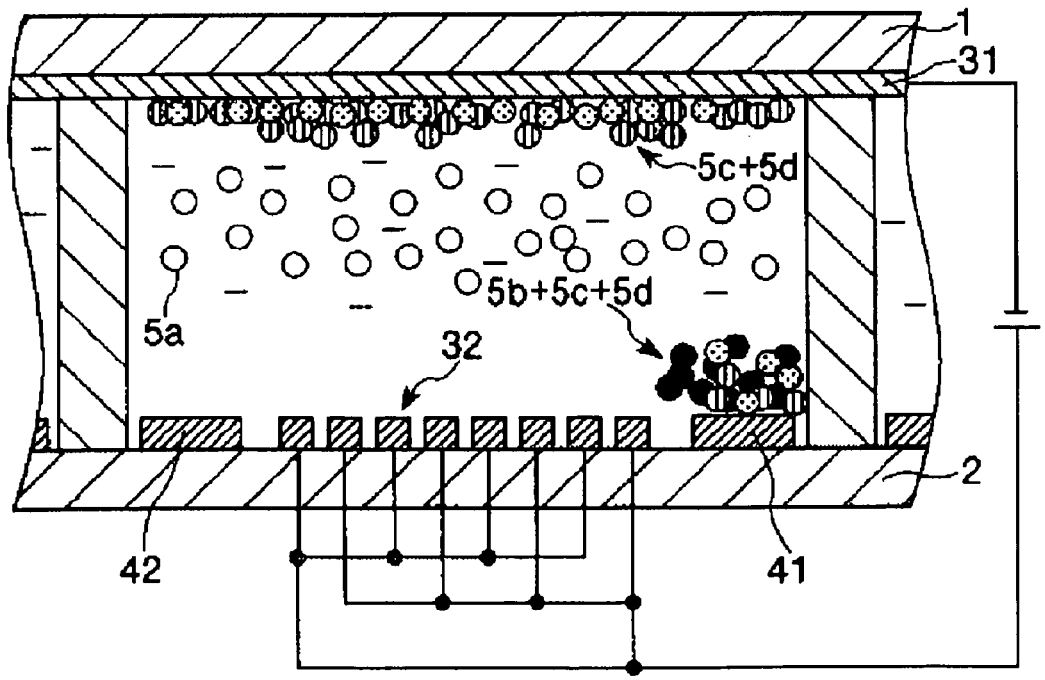

9B: With reference to FIG. 9B, the colored particles 5*d* that have started the migration migrate while pushing away the white particles 5*a* and reach near the first electrode 31. As a consequence, the colored particles 5*d* join with the colored particles 5*c* that had already arrived near the first electrodes 31. As a result, the mixed color made of the color of the colored particles 5*c* and the color of the colored particles 5*d* is displayed at the display section of the display 20.

Through these steps, the initial state of displaying the white display can transfer to the display state of displaying the mixed color of the color of the colored particles 5*c* and the color of the colored particles 5*d*.

Third Embodiment

A third embodiment exemplifying the display and the display method of the invention will now be explained.

Figure 10:
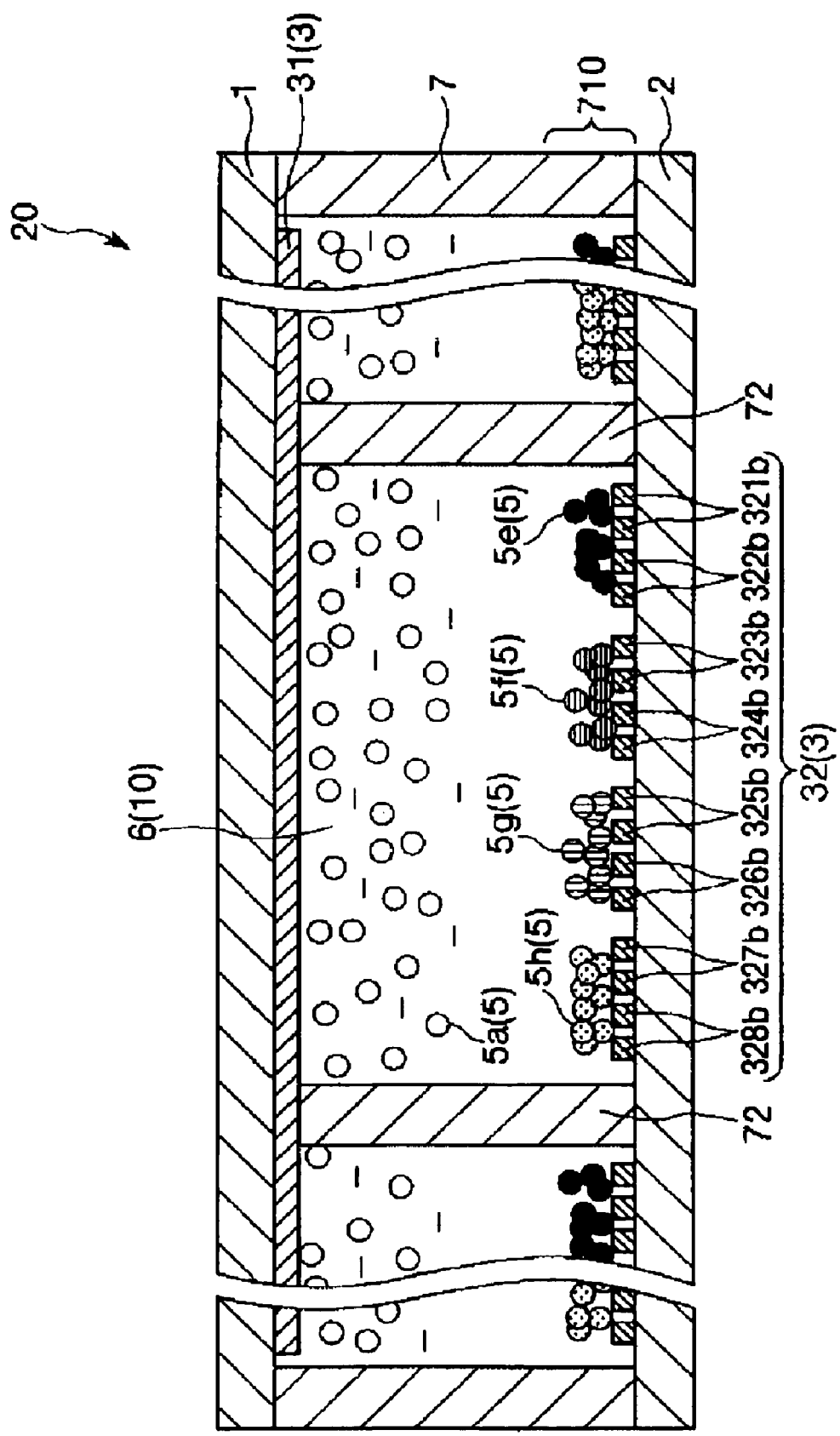
FIG. 10 is a vertical sectional pattern diagram showing a third embodiment of the display of the invention.
Figure 11:
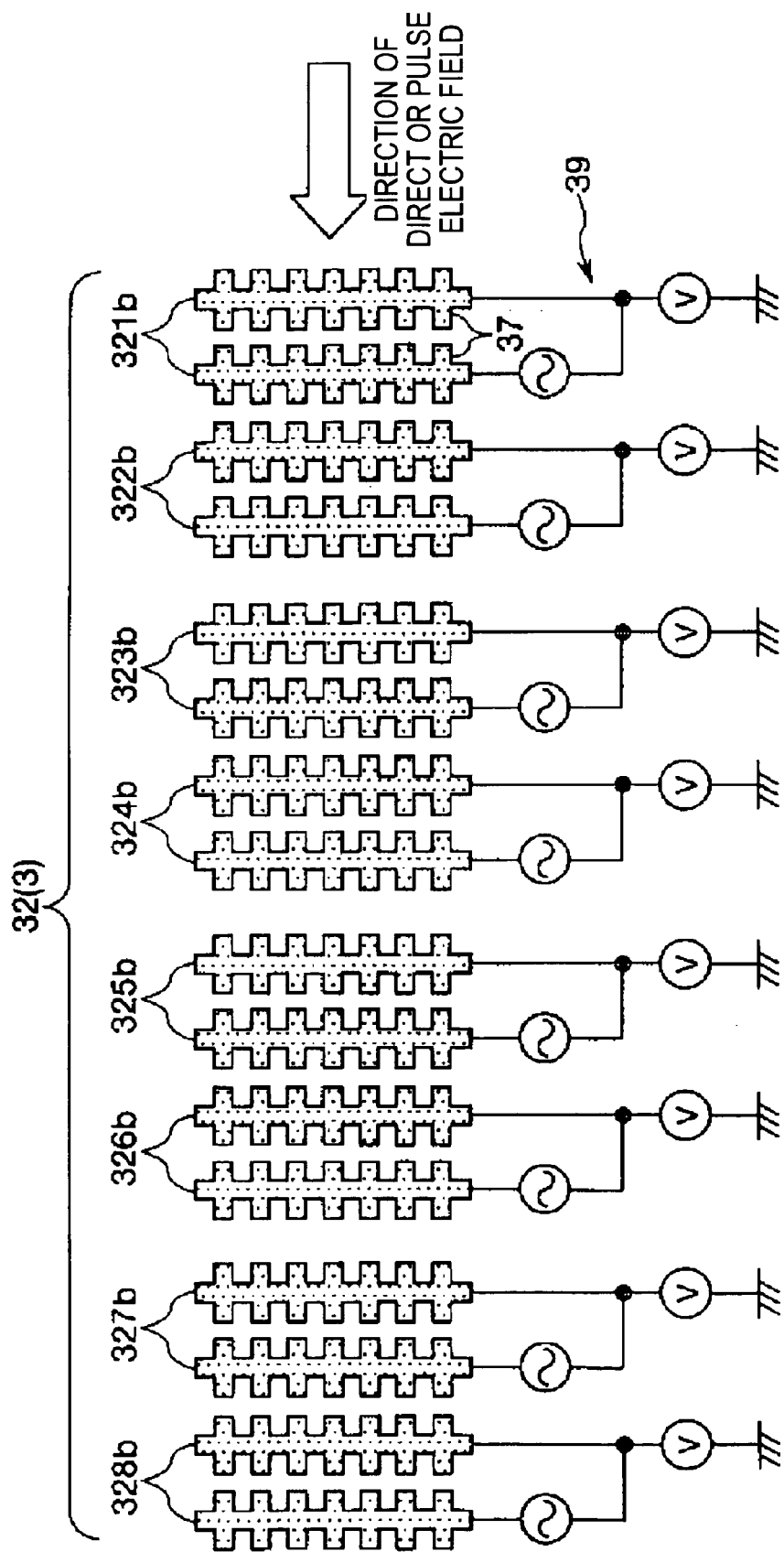
FIG. 11 is a plan diagram showing pairs of electrodes for dielectrophoresis and a circuit of the display shown in FIG. 10.

FIG. 10 is a vertical sectional pattern diagram showing the third embodiment exemplifying the display of the invention. FIG. 11 is a plan diagram showing pairs of electrodes for dielectrophoresis and a circuit of the display shown in FIG. 10. FIGS. 12A, 12B, 13A, 13B, 14A, 14B are pattern diagrams showing operating principles of the display of FIG. 10. For convenience sake, the following will be explained referring the top side in FIG. 10 and FIGS. 12A through 14B as "upper (on, above)" and the bottom side as "lower (under, below)."

Although the third embodiment will be described below, mainly differences from the first embodiment will be explained, and explanation of the similar content will not be repeated.

The display and the display method of the embodiments of the invention are similar to the first embodiment, except that mainly the composition of the separation system of the display is changed along with changes in the separation process of the display method.

With reference to FIG. 10, the display 20 includes eight pairs of electrodes 321*b*, 322*b*, 323*b*, 324*b*, 325*b*, 326*b*, 327*b*, 328*b* (hereunder sometimes abbreviated as "321*b* to 328*b*") for dielectrophoresis on the upper surface of the second substrate 2, arranged apart from each other in this order from the right side of the FIG. 10.

These pairs of electrodes 321*b* to 328*b* for dielectrophoresis have the same structures as those of the pairs of electrodes 321*a*, 322*a*, 323*a*, 324*a* for dielectrophoresis of the first embodiment.

Referring to FIG. 11, the pairs of electrodes 321*b* to 328*b* are each coupled to the power supply circuit (first circuit) 39 that applies voltage between the electrodes. In this embodiment, the separation system includes the eight pairs of electrodes 321*b* to 328*b* and the power supply circuit 39.

The eight pairs of electrodes 321*b* to 328*b* for dielectrophoresis and the pair of electrodes 3 for transfer together constitute the first electrode 31 for transfer. That is, the eight pairs of electrodes 321*b* to 328*b* for dielectrophoresis are used also as at least a part of (in this embodiment, all of) the first electrode 31 for transfer and the opposing second electrode 32 for transfer, out of the pair of electrodes 3 for transfer.

The electrophoretic dispersion liquid 10 filled in the pixel space 71 includes the plurality of kinds of electrophoretic particles 5 having different colors dispersed (suspended) in the liquid phase dispersion medium 6. In this embodiment, the electrophoretic particles 5 are constituted of the white particles 5*a* and four kinds of colored particles 5*e*, 5*f*, 5*g*, 5*h*. The structure of each of the colored particles 5*e*, 5*f*, 5*g*, 5*h* is identical to that of each of the colored particles 5*b*, 5*c*, 5*d* of the first embodiment.

The third embodiment of the operation (behavior) of such a display 20, that is, the third embodiment of the display method of the invention, will now be explained.

As one example of the operation of the display 20, one pixel space 71 will be exemplified regarding the operation of the display 20 that begins with the initial state of displaying the white display and transfers to the display state of displaying the color of the colored particles 5*f*.

In this embodiment, zeta potential of the white particles 5*a* is substantially zero, and the polarity of zeta potential of each of the colored particles 5*e*, 5*f*, 5*g*, 5*h* is positive (positively charged).

1C: In the initial state, the locations of the white particles 5*a* and the colored particles 5*e*, 5*f*, 5*g*, 5*h* are not particularly determined. However, in this case, the white particles 5*a* stay near the first electrode 31, with reference to FIG. 12A, and perform the white display.

Then, by operating each direct current power supply 391 of the power supply circuit 39, a direct or pulse voltage is applied between the pair of electrodes 3 while inverting the application direction at a relatively long interval. Accordingly, an electric field of which direction is inverted at the relatively long interval is generated between the pair of electrodes 3 in the pixel space 71. Under the influence of this electric field, referring to FIG. 12A, each of the colored particles 5*e*, 5*f*, 5*g*, 5*h* migrates back and forth between the pair of electrodes 3 (see arrows in FIG. 12A).

Figure 12A:
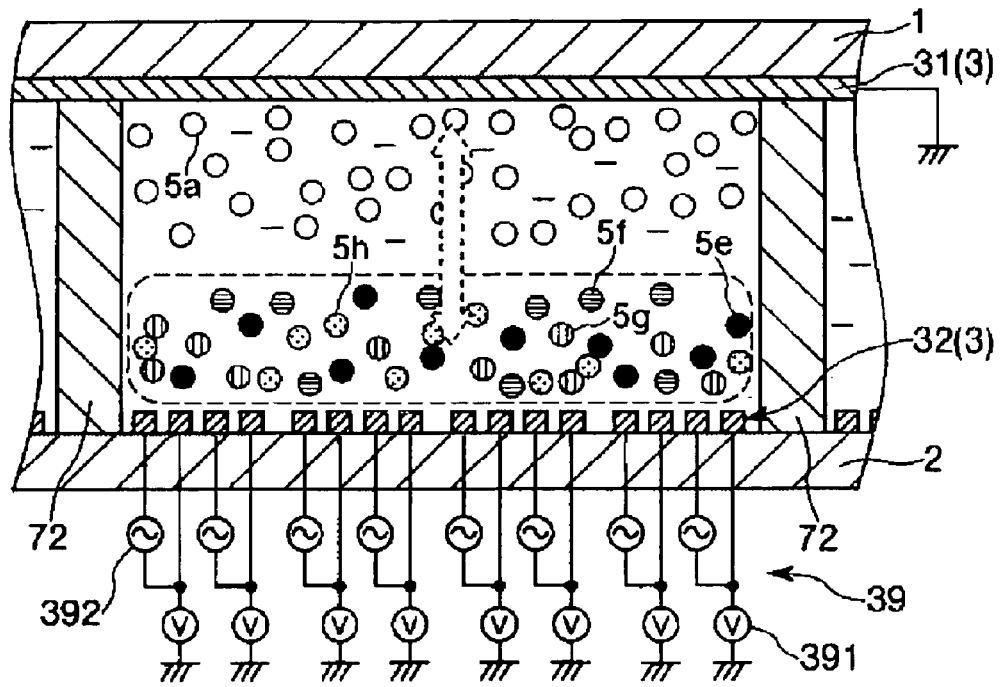
FIGS. 12A and 12B are pattern diagrams showing operating principles of the display shown in FIG. 10.
Figure 12B:
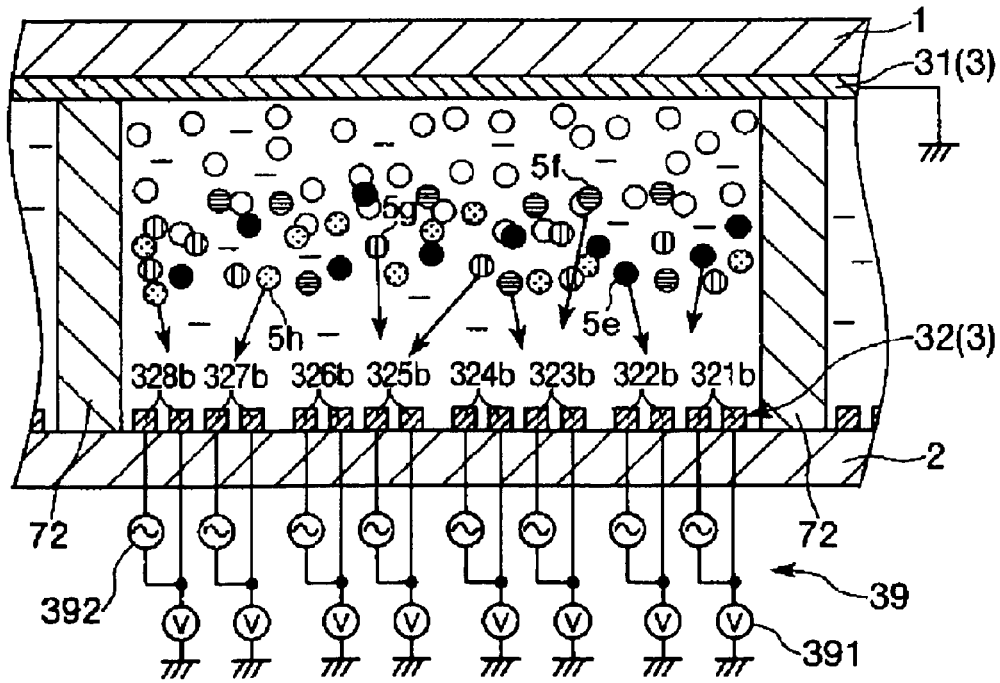

To generate such an electric field, for example, the first electrode 31 is connected to ground, and the potential of the second electrode 32 is inverted at a predetermined interval, with reference FIG. 12A.

In this case, the interval at which the potential of the second electrode 32 is inverted is a time that allows each of the colored particles 5*e*, 5*f*, 5*g*, 5*h* to smoothly migrate back and forth the entire length of the distance between the pair of electrodes 3. The interval is suitably established with respect to conditions such as electrophoretic mobility of each of the colored particles 5*e*, 5*f*, 5*g*, 5*h* and viscosity of the liquid phase dispersion medium 6.

2C: Next, by operating each alternating current power supply 392 of the power supply circuit 39, an alternating voltage of a predetermined frequency is applied between each pair of the eight pairs of electrodes 321*b* to 328*b* during migration of the colored particles 5*e*, 5*f*, 5*g*, 5*h*. The alternating electric field of the predetermined frequency is thereby generated between the electrodes.

The alternating voltage to be applied between each pair of the electrodes 321*b*, 322*b* is an alternating voltage having a specific frequency at which the dielectrophoretic force generated in the colored particles 5*e* becomes greater than that generated in the other colored particles (the colored articles 5*f*, 5*g*, 5*h*). When the alternating voltage of such a specific frequency is applied between the electrodes, a particularly strong dielectrophoretic force is generated between the electrodes, and hardly any dielectrophoretic force or only a relatively weak dielectrophoretic force is generated in the colored particles 5f, 5g, 5h.

Also, the alternating voltage applied between each of the pair of electrodes 323b, 324b is an alternating voltage having a specific frequency corresponding to the colored particles 5f. The alternating voltage applied between each of the pair of electrodes 325b, 326b is an alternating voltage having a specific frequency corresponding to the colored particles 5g. The alternating voltage applied between each of the pair of electrodes 327b, 328b is an alternating voltage having a specific frequency corresponding to the colored particles 5h.

As set forth, by applying the alternating voltage between the electrodes, the dielectrophoretic force is exerted selectively on the specific colored particles. As a result, with reference to FIG. 12B, under the influence of the alternating electric field of the specific frequency that corresponds to each of the colored particles 5e, 5f, 5g, 5h, the particles of different kinds are separated in accordance with their kinds, while the colored particles of the same kinds gather.

Figure 13A:
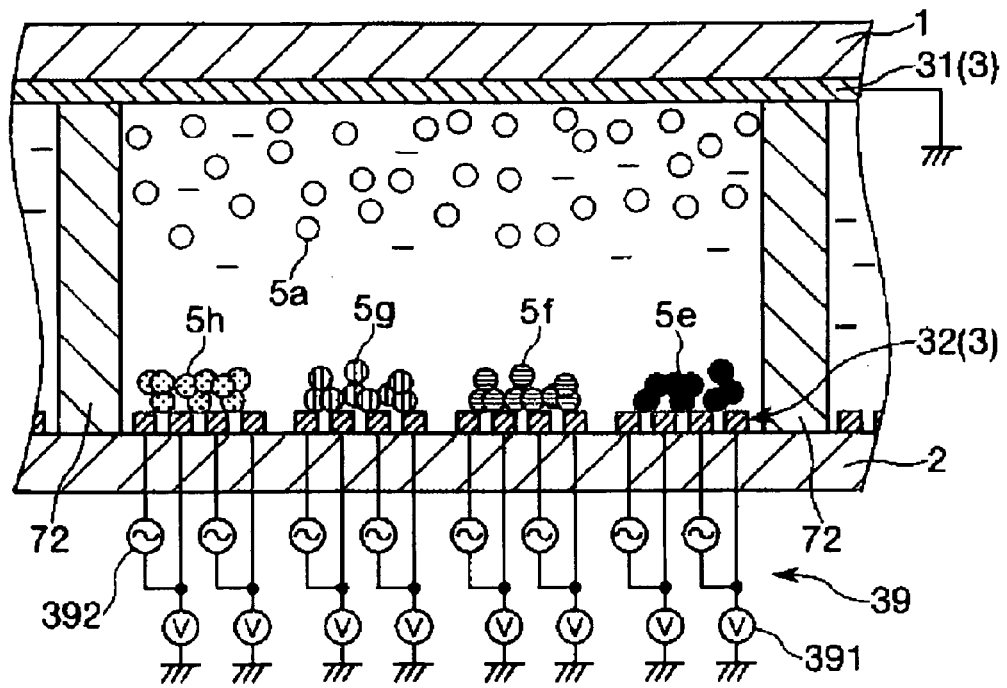
FIGS. 13A and 13B are pattern diagrams showing operating principles of the display shown in FIG. 10.
Figure 13B:
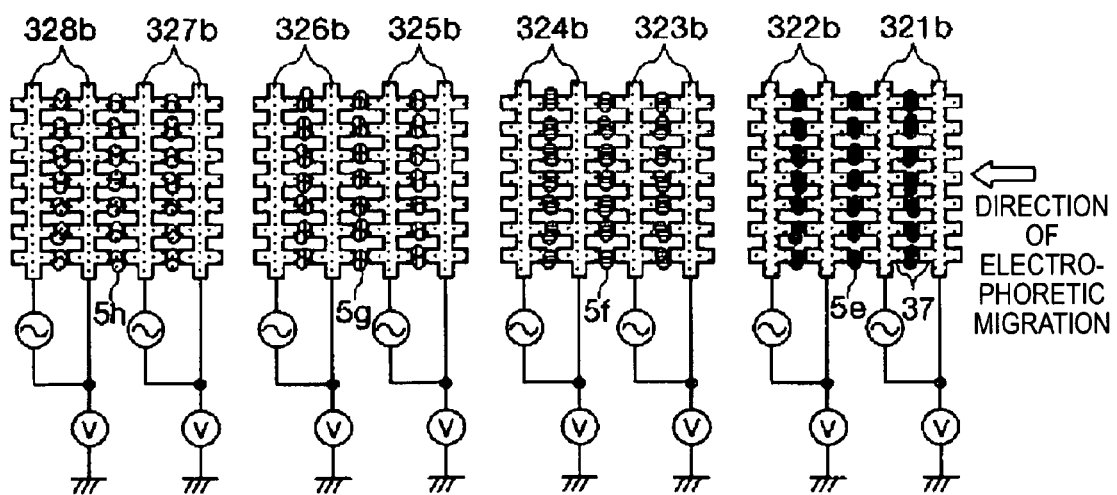

Finally, with reference to FIGS. 13A and 13B, the colored particles 5e, 5f, 5g, 5h are separated in accordance with their kinds and captured near the respective pairs of electrodes 321b to 328b.

In this case, with reference to FIG. 13B, the colored particles 5e, 5f, 5g, 5h are captured at the respective portions interposed between the convexes 37, out of the pairs of electrodes 321b to 328b.

3C: Next, by operating each direct current power supply 391, a direct or pulse voltage is applied between the pair of electrodes 3 so that the potential of the first electrode 31 becomes lower than that of the pair of electrodes 323b, 324b (a part of the second electrode 32 for transfer). Accordingly, a direct or pulse electric field that heads from the pair of electrodes 323b, 324b to the first electrode 31 is generated in the pixel space 71. Then, under the influence of this electric field, the colored particles 5f captured by the pair of electrodes 323b, 324b start migrating toward the first electrode 31, with reference to FIG. 14A.

Figure 14A:
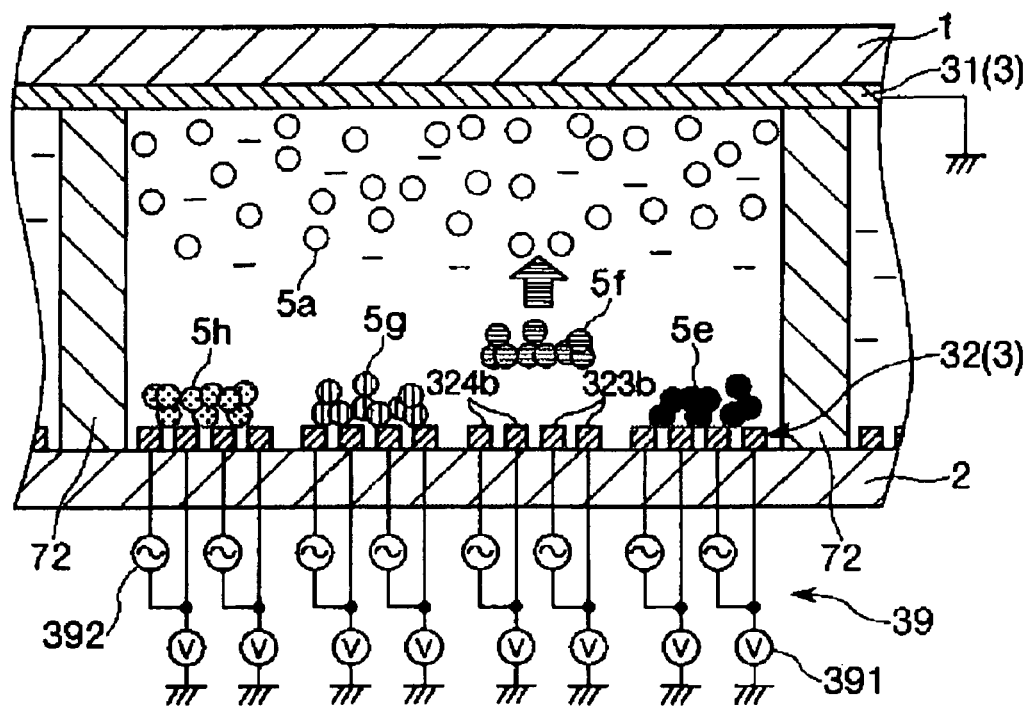
FIGS. 14A and 14B are pattern diagrams showing operating principles of the display shown in FIG. 10.
Figure 14B:
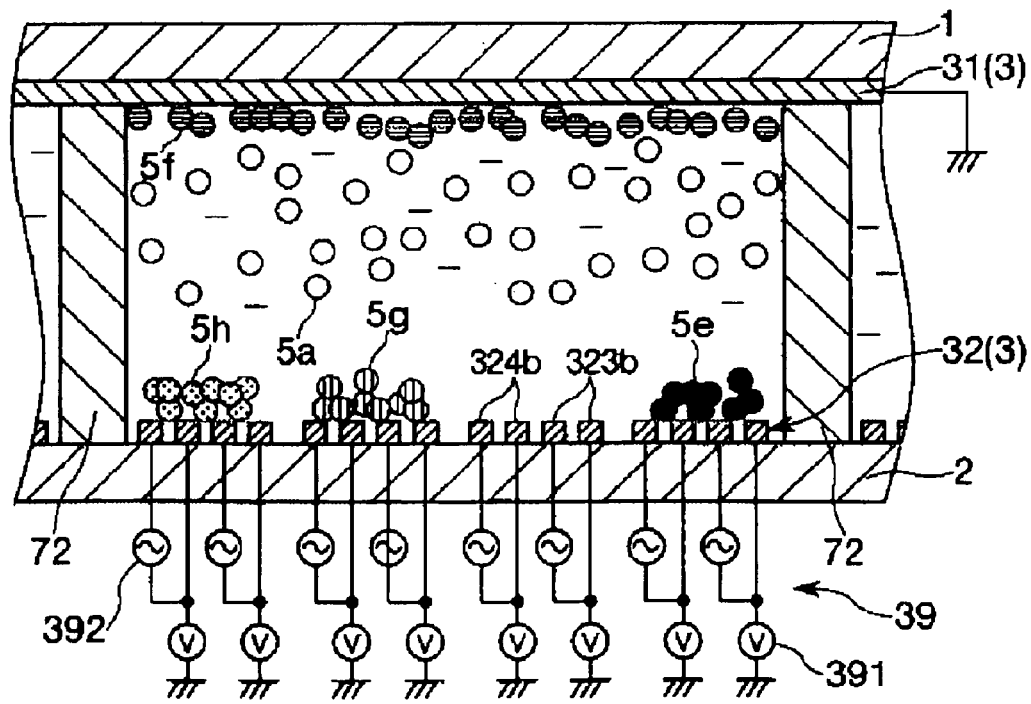

4A: With reference to FIG. 14B, the colored particles 5f that started the electrophoretic migration reach near the first electrode 31. As a result, the content (display color) displayed at the display section changes from the color of the white particles 5a to the color of the colored particles 5f. That is, the initial state of the white display is transferred to the display state.

An advantage of this embodiment is that it is possible to readily control whether one kind of color is to be displayed or a plurality of kinds of colors of the colored particles are to be displayed as the display state. This is done in step 3C by selecting to which electrodes the potential should be applied, out of the plurality of electrodes (the pairs of electrodes 321b to 328b) that belong to the second electrode 32.

In short, according to the display 20 of the embodiments of the invention, because it is possible to simultaneously separate the plurality of kinds of colored particles having different colors, the display 20 is readily controlled.

Fourth Embodiment

A fourth embodiment of the display of the invention will now be described.

Figure 15:
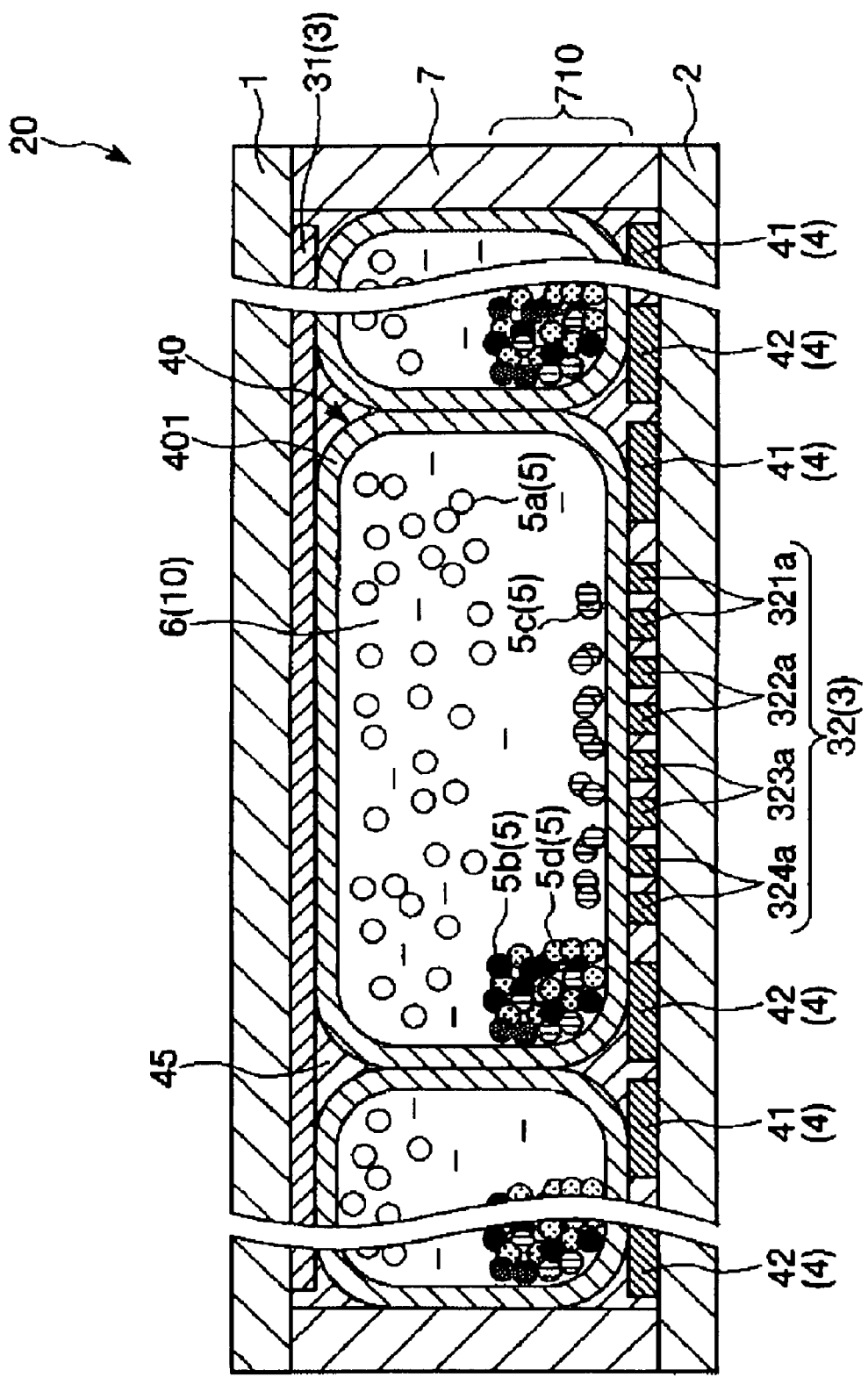
FIG. 15 is a vertical sectional pattern diagram showing a fourth embodiment of the display of the invention.

FIG. 15 is a vertical sectional pattern diagram showing the fourth embodiment exemplifying the display of the invention. For convenience sake, the following will be explained referring the top side in FIG. 15 as "upper (on, above)" and the bottom side as "lower (under, below)."

Although the fourth embodiment will be described below, mainly differences from the first embodiment will be explained, and explanation of the similar content will not be repeated.

The display 20 with reference to FIG. 15 has the same structure as that of the first embodiment, except that the partition walls 72 are not included and that a binder 45 and a plurality of microcapsules 40 that encapsulate the electrophoretic dispersion liquid 10 in capsule bodies (shells) 401 are both filled in the airtight spaces partitioned by the substrates 1, 2.

Referring to FIG. 15, the plurality of microcapsules 40 is arranged vertically and horizontally in a single layer (one next to the other without being stacked in the thickness direction) between the substrates 1, 2.

In this embodiment, by narrowly interposing the microcapsules 40 from upper and lower directions, the microcapsules 40 are compressed, flattened, and spread out in the horizontal direction.

With the display 20 having such a structure, an effective display region as well as the contrast increases as compared to a case in which the microcapsules do not have the flat configuration.

In this embodiment, each microcapsule 40 is arranged so as to correspond with each pixel. That is, each microcapsule 40 is arranged corresponding to the electrodes 3, 4 that are provided corresponding to each pixel. Thus, even if no partition walls 72 are included, the multicolor display can be reliably performed in the pixel space.

Additionally, in the embodiment, a pixel space represents a part corresponding to one microcapsule 40.

Examples of the material constituting the capsule body (shell) 401 are: gelatin, a composite material of gum arabic and gelatin, and various kinds of resin materials such as urethane resin, melamine resin, urea resin, polyamide, and polyether. They may be used singly, or more than one of these kinds may be used in combination.

In the constituting material of the capsule body 401, cross-links (three-dimensional cross-links) may be formed using a cross-linking reagent. The strength of the capsule body 401 is thereby increased while maintaining flexibility. As a result, the microcapsule 40 is prevented from being readily disintegrated.

It is desirable that the size of the microcapsule 40 be uniform so that occurrence of display irregularities is prevented or reduced and that the display 20 can deliver an improved display performance.

The binder 45 is supplied for such purposes as to bond the first and substrate 1 and the second substrate 2, to stabilize the first and second substrates 1, 2 and the microcapsules 40, and to secure insulation between the electrodes 3, 4. Accordingly, it is possible to increase durability and reliability of the display 20.

A suitable material for the binder 45 is a resin material having excellent affinity (adhesiveness) to the electrodes 3, 4 and to the capsule bodies 401 (microcapsules 40).

Also, it is desirable that the dielectric constant of the binder 45 be set substantially equal to that of the liquid phase dispersion medium 6. Therefore, it is desirable to add to the binder 45 alcohols such as 1,2-butanediol or 1,4-butanediol, ketones, or a dielectric constant conditioner such as carboxylate.

Electronic Device

The display as described hereinabove can be incorporated in various types of electronic devices. In the following, the electronic device of the invention having the display will be described below.

Electronic Paper

An example of the electronic device of the invention applied to electronic paper will first be explained.

Figure 16:
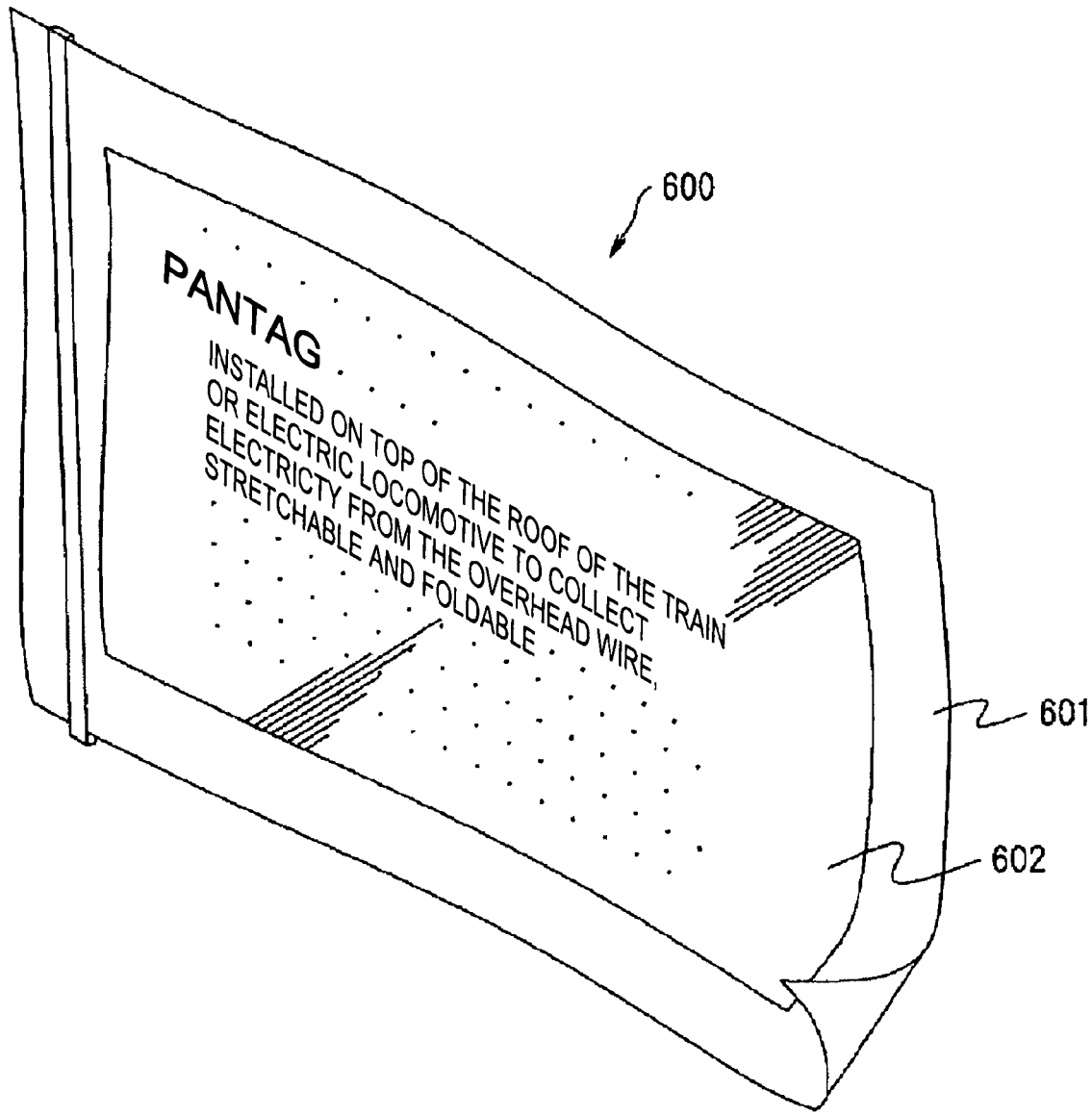
FIG. 16 is a perspective diagram showing electronic paper exemplifying an electronic device of the invention.

FIG. 16 is a perspective diagram showing the example in which the electronic device of the invention is applied to the electronic paper.

With reference to FIG. 16, electronic paper 600 includes a main body 601 constituted of a rewritable sheet having the same texture and flexibility as paper and a display unit 602.

The display unit 602 of such electronic paper 600 is constituted of the display as described above.

Display Unit

An embodiment of the electronic device of the invention applied to a display unit will now be described.

Figure 17A:
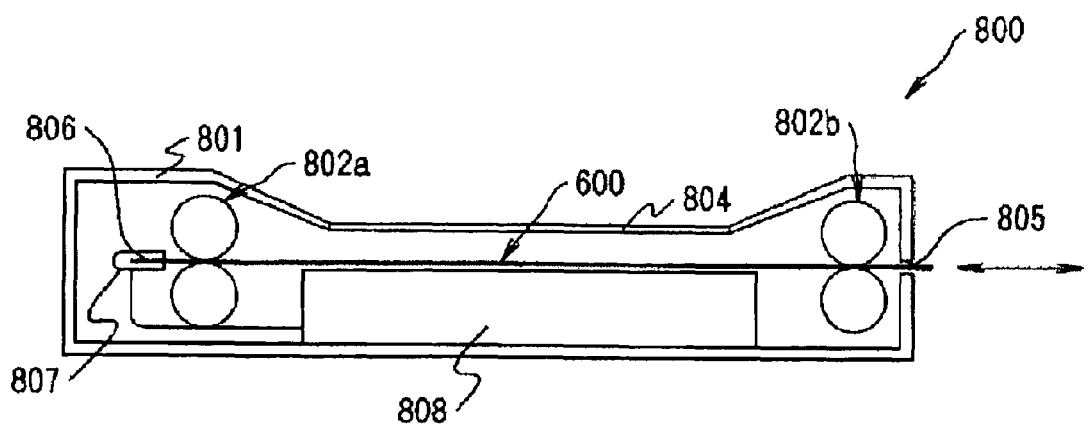
FIGS. 17A and 17B are diagrams showing a display unit exemplifying the electronic device of the invention.
Figure 17B:
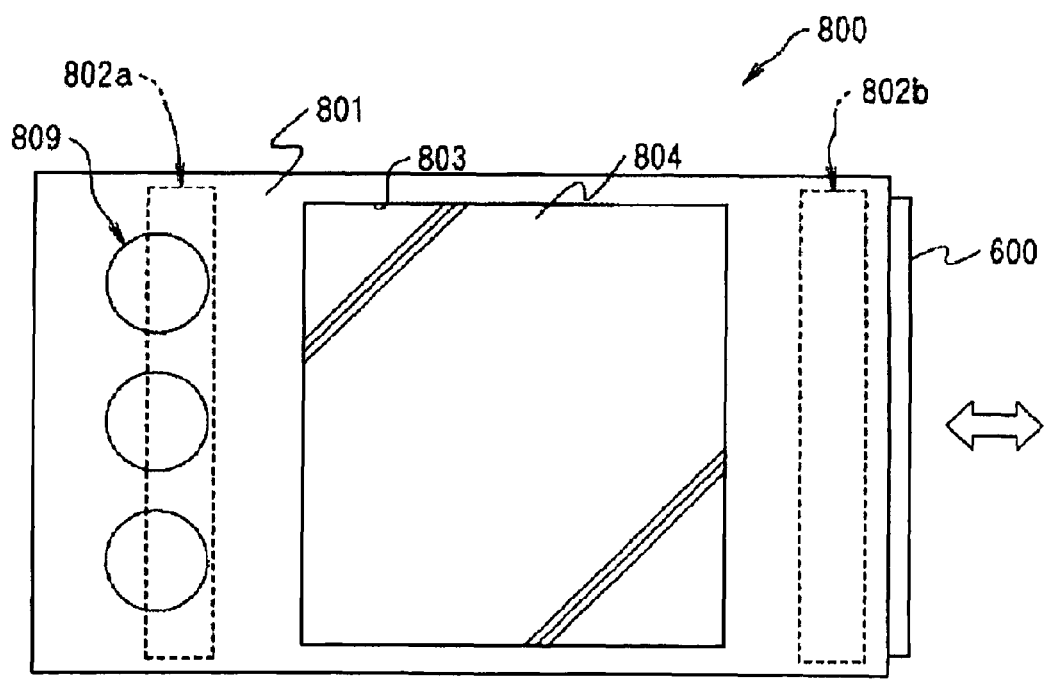

FIGS. 17A and 17B are diagrams showing the display unit exemplifying the electronic device of the invention. FIG. 17A is the sectional diagram, and FIG. 17B is the plan diagram.

Referring to FIGS. 17A and 17B, a display unit (a display) 800 is equipped with a body 801 and the electronic paper 600 that is detachable from the body 801. The electronic paper 600 has the same structure as that described above, that is, as that shown in FIG. 16.

The body 801 includes an insertion port 805 to allow insertion of the electronic paper 600 at the side of the body 801 (at right in FIGS. 17A and 17B) and two pairs of conveying rollers 802a, 802b inside the body 801. When the electronic paper 600 is inserted into the body 801 through the insertion port 805, the paper 600 is set in the body 801 while held between the conveying rollers 802a, 802b.

Provided on the side adjacent a display plane (a plane at the front of FIG. 17A) of the body 801 is a rectangular hole 803 in which a transparent glass plate 804 is set. Accordingly, the electronic paper 600 as set in the body 801 is recognizable from outside the body 801. That is, the display plane of the display unit 800 is composed in a manner that the electronic paper 600 as set in the body 801 is recognizable through the transparent glass plate 804.

An end of the electronic paper 600 in the insertion direction (at left in FIGS. 17A and 17B) is provided with a terminal 806. Inside the body 801, a socket 807 connected to this terminal 806 is provided, with the electronic paper 600 being set in the body 801. The socket 807 is electrically coupled to a controller 808 and an operating section 809.

In this display unit 800, the electronic paper 600 is detachably set in the body 801. The display unit 800 may be carried around while the unit 800 is detached from the body 801.

Additionally, in such a display unit 800, the electronic paper 600 is constituted of the display 20 as set forth.

The electronic device of the invention is applicable to other equipment, in addition to those described above, such as: televisions, view-finder-type and direct-monitor-type videotape recorders, car navigation systems, pagers, electronic organizers, desktop electronic calculators, electronic newspapers, word processors, personal computers, workstations, TV phones, point-of-sale (POS) terminals, and equipment having touch panels. The display of the invention is applicable to display sections of these various types of electronic equipment.

The display, display method, and electronic device of the invention are described hereinabove based on the illustrated examples. However, the embodiments of the invention are not limited to these examples.

Also, if necessary, the display method of the invention may include any additional processes.

Further, each display of the invention may contain two or more structures of the described examples.

What is claimed is:

1. A display, comprising:
a planar display section;
a pixel space provided next to a side adjacent to one surface of the display section and encapsulating a plurality of kinds of colorants, each kind having a different color;
an accumulation section provided in the pixel space and accumulating the colorants;
a separation system that separates a specific kind of colorant from the accumulated colorants in the accumulation section;
a transfer system that selects at least one kind of colorant from the separated colorants and transfers the selected colorant to the side adjacent to the display section of the pixel space, wherein:
the separation system performs separation utilizing difference in a magnitude of a dielectrophoretic force generated in each colorant upon receipt of an alternating electric field of a specific frequency applied by this system, the magnitude varying depending on the kind of the colorant,
a color of at least the one kind of colorant transferred by the transfer system is displayed at the display section,
the separation system selects and separates the specific kind of colorant from the accumulated colorants by applying, as a driving force, an alternating electric field of a specific frequency at which a dielectrophoretic force is generated in the specific kind of colorant out of the colorants, the dielectrophoretic force being greater than those generated in other kinds of colorants, the separation system further comprising
a pair of electrodes for electrophoresis that applies a direct or pulse electric field and
a circuit that applies a voltage between the pair of electrodes for electrophoresis and separates the specific kind of colorant while electrophoretically migrating the colorants by the action of the electric field.

2. The display according to claim 1, wherein the separation system further comprises:
at least one pair of electrodes for dielectrophoresis arranged in the accumulation section substantially parallel to the display section and applying the alternating electric field of the specific frequency to each of the colorants;
a circuit applying a voltage between the pair of electrodes for dielectrophoresis; and
a frequency varying circuit controlling the frequency of the voltage applied to the voltage applying circuit so as to change the frequency of the alternating electric field.

3. The display according to claim 2, wherein the pair of electrodes for dielectrophoresis includes, between these electrodes, a plurality of sections of electric field have different strength.

4. The display according to claim 3, wherein the separation system selects and separates the specific kind of colorant from the accumulated colorants, by absorbing the specific kind of colorant near the sections of strong electric field between the pair of electrodes for dielectrophoresis by the action of the dielectrophoretic force.

5. The display according to claim 3, wherein the sections of electric field have different strength throughout the pair of electrodes for dielectrophoresis.

6. The display according to claim 3, wherein the pair of electrodes for dielectrophoresis includes a section in which a distance between the electrodes varies.

7. The display according to claim 1, wherein the separation system includes a plurality of pairs of electrodes for dielectrophoresis and separates different kinds of colorants from the accumulated colorants by generating, at each pair, an alternating electric field of a different frequency.

8. The display according to claim 1, wherein:
at least the one pair of electrodes for dielectrophoresis is constituted of, at least in part, interdigital electrodes aligned substantially parallel to each other; and
each of the electrodes is arranged in a direction substantially perpendicular to a direction in which the colorants electrophoretically migrate by the action of the direct or pulse electric field.

9. The display according to claim 1, wherein the transfer system transfers the separated specific kind of colorant using the electrophoretic force that is generated in the specific kind of colorant upon receipt of a direct or pulse electric field generated by the system.

10. The display according to claim 9, wherein the transfer system further comprises:
a second pair of electrodes for transfer interposing the pixel space therebetween and disposed on a side adjacent to the display section and on a side opposite from the display section; and
a circuit applying a voltage between the second pair of electrodes for transfer interposing the pixel space.

11. The display according to claim 1, further comprising:
a plurality of pixel spaces; and
the separation system and the transfer system corresponding to each pixel space.

12. A display, comprising:
a first substrate;
a second substrate;
an electrophoretic dispersion liquid positioned between the first and second substrates;
a first electrode through a fourth electrode positioned between the second substrate and the electrophoretic dispersion liquid;
a first circuit applying a first electric field between the first and second electrodes; and
a second circuit applying a second electric field between the third and fourth electrodes, wherein:
the electrophoretic dispersion liquid includes a first colorant and a second colorant of a different dielectrophoretic force;
the first and second electrodes are located between the third and fourth electrodes;
the first electric field imparting a dielectrophoretic force to the first and second colorants and allocating these colorants between the first and second electrodes;
the second electric field imparting an electrophoretic force to the first and second colorants and moving the same between the third and fourth electrodes; and
a separation system that selects and separates a specific kind of colorant from accumulated colorants by applying, as a driving force, an alternating electric field of a specific frequency at which a dielectrophoretic force is generated in the specific kind of colorant out of the colorants, the dielectrophoretic force being greater than those generated in other kinds of colorants, the separation system further comprising
a pair of electrodes for electrophoresis that applies a direct or pulse electric field, and
a circuit that applies a voltage between the pair of electrodes for electrophoresis and separates the specific kind of colorant while electrophoretically migrating the colorants by the action of the electric field.

13. A display, comprising:
a first substrate;
a second substrate;
an electrophoretic dispersion liquid positioned between the first and second substrates;
a first electrode through a fourth electrode positioned between the second substrate and the electrophoretic dispersion liquid;
a first circuit applying a first electric field between the first and second electrodes; and
a second circuit applying a second electric field between the third and fourth electrodes, wherein:
the electrophoretic dispersion liquid includes a first colorant and a second colorant of a different dielectrophoretic force;
the first electric field imparting a dielectrophoretic force to the first colorant and allocating this colorant between the first and second electrodes;
the second electric field imparting a dielectrophoretic force to the second colorant and allocating this colorant between the third and fourth electrodes; and
a separation system that selects and separates a specific kind of colorant from accumulated colorants by applying, as a driving force, an alternating electric field of a specific frequency at which a dielectrophoretic force is generated in the specific kind of colorant out of the colorants, the dielectrophoretic force being greater than those generated in other kinds of colorants, the separation system further comprising
a pair of electrodes for electrophoresis that applies a direct or pulse electric field, and
a circuit that applies a voltage between the pair of electrodes for electrophoresis and separates the specific kind of colorant while electrophoretically migrating the colorants by the action of the electric field.

14. A display method, comprising:
(a) separating, within a pixel space provided next to a side adjacent to one surface of a planar display section, a specific kind of colorant out of a plurality of kinds of colorants having different colors by applying an alternating electric field to the plurality of kinds of colorants by use of a dielectrophoretic force generated in each of the colorants as a driving force; and
(b) selecting at least one kind of colorant out of the separated colorants and transferring this colorant to the side adjacent to the display section of the pixel space; and
(c) displaying a color of at least the one kind of colorant transferred in step (b), wherein the separation is performed in step (a) by applying an electric field of a specific frequency to the specific kind of colorant that corresponds to a color to be displayed at the display section, the frequency being such that the dielectrophoretic force generated in the specific kind of colorant is greater than dielectrophoretic forces generated in other kinds of colorants, wherein
the step of separating is performed by a separation system that selects and separates a specific kind of colorant from accumulated colorants by applying, as a driving force, an alternating electric field of a specific frequency at which a dielectrophoretic force is generated in the specific kind of colorant out of the colorants, the dielectrophoretic force being greater than those generated in other kinds of colorants, the separation system further comprising
(d) applying a direct or pulse electric field using a pair of electrodes for electrophoresis, and (e) applying, using a circuit, a voltage between the pair of electrodes for electrophoresis and separating the specific kind of colorant while electrophoretically migrating the colorants by the action of the electric field.

15. The display method according to claim 14, further comprising repeatedly conducting the steps (a) and (b) so as to increase a ratio of the specific kind of colorant separated out of the plurality of colorants.

16. An electronic device containing the display device according to claim 1.

* * * * *